(12) United States Patent
Ninh

(10) Patent No.: US 6,212,274 B1
(45) Date of Patent: Apr. 3, 2001

(54) LINE POWERED MODEM

(75) Inventor: Winston Ninh, San Antonio, TX (US)

(73) Assignee: Data Race, Inc., San Antonio, TX (US)

( * ) Notice: Subject to any disclaimer, the term of this patent is extended or adjusted under 35 U.S.C. 154(b) by 0 days.

(21) Appl. No.: 08/968,956

(22) Filed: Nov. 12, 1997

Related U.S. Application Data

(60) Provisional application No. 60/050,878, filed on Jun. 26, 1997.

(51) Int. Cl.[7] ............................. H04M 9/00; H04M 11/00
(52) U.S. Cl. .................... 379/413; 379/93.36; 379/93.28
(58) Field of Search ................................ 379/413, 93.36, 379/102.04, 93.28; 375/222

(56) References Cited

U.S. PATENT DOCUMENTS

| | | | |
|---|---|---|---|
| 4,395,590 | * | 7/1983 | Pierce et al. ........................ 379/413 |
| 4,951,309 | * | 8/1990 | Gross et al. ...................... 379/93.36 |
| 5,086,454 | * | 2/1992 | Hirzel ............................... 379/93.36 |
| 5,530,748 | * | 6/1996 | Ohmori ................................ 379/413 |

* cited by examiner

Primary Examiner—Forester W. Isen
Assistant Examiner—Brian Tyrone Pendleton
(74) Attorney, Agent, or Firm—Conley, Rose & Tayon, PC.; Robert C. Kowert

(57) ABSTRACT

A battery powered computer system includes an add-on device, such as a modem, with a power supply that uses power from a telephone line to provide power to the modem. In one embodiment the power supply is an adaptive power supply that uses power from both the telephone line and the battery of the computer system. The adaptive power supply determines the maximum power available from the telephone line and delivers that power to the modem. If the power from the telephone line is not sufficient for the modem, the adaptive power supply supplements the power with the power from the computer system. In one embodiment, the adaptive power supply uses power time division multiplexing to share the power from the telephone line and the computer system.

17 Claims, 24 Drawing Sheets

LINE POWERED MODEM

The benefit of priority is hereby claimed to Provisional Application Ser. No. 60/050,878 entitled "Line-Powered Modem" filed on Jun. 26, 1997.

BACKGROUND OF THE INVENTION

1. Field of the Invention

This invention relates to computer systems employing modems and more particularly to power supply circuits for modems.

2. Description of the Related Art

An ongoing developmental goal of manufacturers has been to reduce the power consumption of computer systems. Reducing power consumption typically reduces heat generation of the system, thereby increasing reliability and decreasing costs. Reducing power consumption has been particularly important in maximizing the operating life of battery powered portable computer systems. Battery powered portable computer systems include personal information devices ("PIDs"), hand held personal computers ("HPC"), digital assistants and smart phones.

Battery powered portable computer systems have limited use before requiring recharge or replacement of the batteries. In most cases, add-on devices, such as modems, create an additional power drain on the limited power available from the batteries. Often times, the batteries cannot provide enough power for both the portable computer system and an add-on device. Alternatively, if the batteries can provide enough power for both the computer system and add on device, the life of the battery (prior to recharge or replacement) is severely limited. In some cases, with relatively high-power add-on devices, such as a V.34 modem, the battery life is so limited that use of the add-on device is impracticable.

What is desired is an alternative power source for providing power to add-on devices and/or computer systems.

SUMMARY OF THE INVENTION

The present invention solves the problems discussed above by using an adaptive power source for extracting the maximum available power from a telephone line to supplement from an internal battery. In one embodiment, the adaptive power source determines the maximum power available from the phone line, calculates a power ratio as a function of the maximum power available on the telephone line and the power needed to operate an add-on device. The adaptive power source thereafter distributes power to the add-on device from the telephone line and/or the battery as a function of the calculated power ratio. In one embodiment, the adaptive power supply provides all the power to the add-on device from the telephone line. Throughout this specification, a modem is used as an example of an add-on device. It is noted, however, that the present invention is applicable to any add-on device that interfaces to a telephone line.

In one embodiment, the adaptive power source is a transformer-based switching power supply. In one particular embodiment, the power provided to a modem is obtained from power extracted from the telephone line and/or the internal battery. The transformer provides electrical isolation between the telephone line and the power system of the computer system.

In an alternative embodiment, the adaptive power supply includes switched capacitors to extract power from the telephone line. In one particular embodiment, the adaptive power supply includes a pair of capacitors. At any one time, one capacitor is being charged from the telephone line while the other capacitor is providing power to the modem. At a predetermined rate, the capacitors are switched such that the capacitor that was previously being charged from the telephone line provides power to the modem and the capacitor that was previously providing power to the modem is charged by the telephone line. The switched capacitor design is a highly efficient method of power transfer and provides electrical isolation between the telephone line and the computer system.

In still another embodiment, the adaptive power source implements a non-isolated design in which power is shared from the telephone line and the internal battery. The non-isolated design does not electrically isolate the telephone line from the internal computer system but provides very low losses and high efficiency.

One advantage of the present invention is that it provides add-on devices, such as modems, with power extracted from a telephone line. Another advantage of the present invention is that it may provide all the power needed to run an add-on device from the telephone line. Still another advantage of the present invention is it determines the maximum power available from a telephone line and supplements that power with power from the computer system.

BRIEF DESCRIPTION OF THE DRAWINGS

Other objects and advantages of the invention will become apparent upon reading the following detailed description and upon reference to the accompanying drawings in which.

Figure 1:
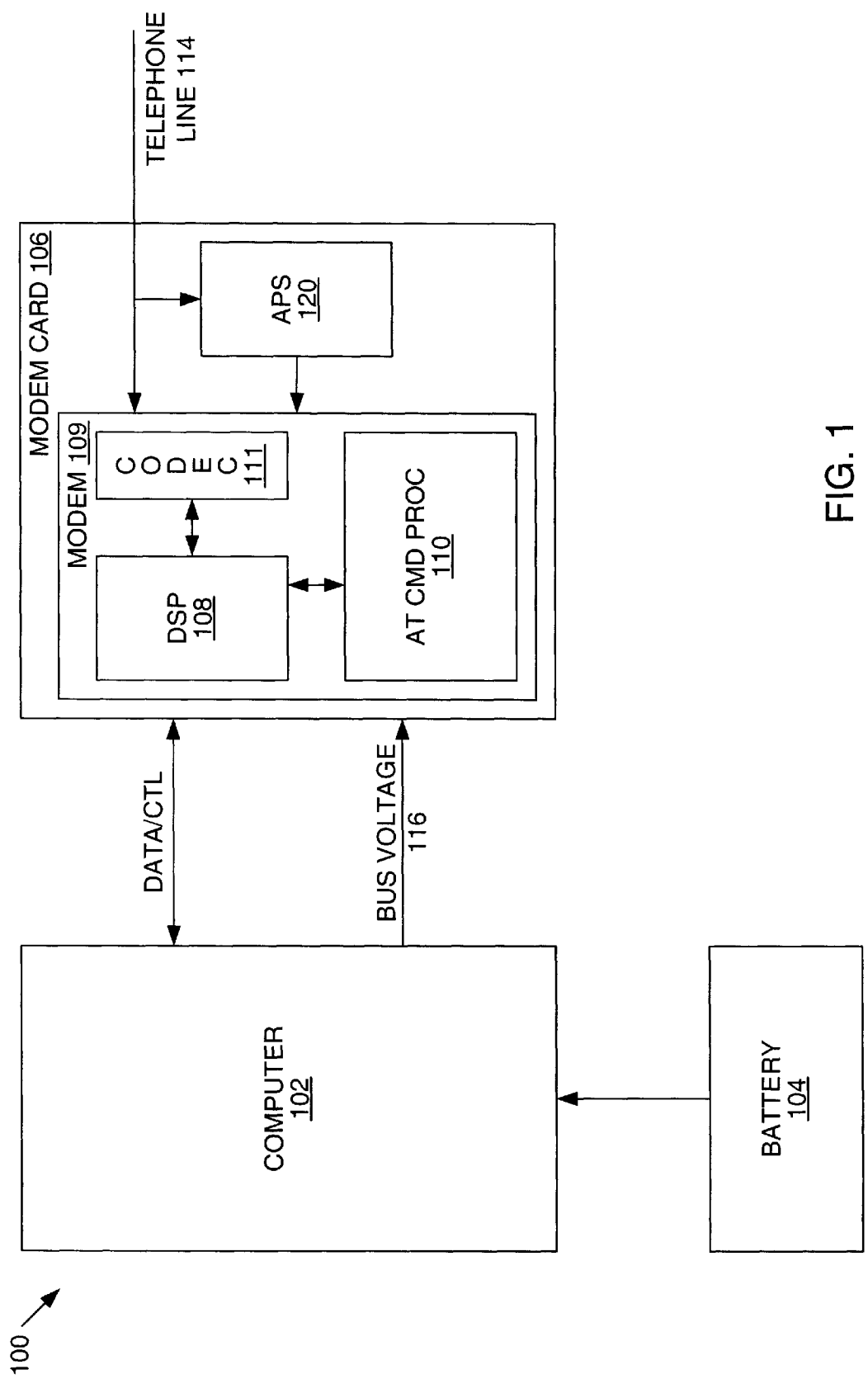
FIG. 1 is a schematic diagram of a battery powered computer system including a modem according to one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of a battery powered computer system including a modem is shown. Computer system 100 includes computer 102, battery 104 and modem card 106. Battery 104 provides power to computer 102. Modem card 106 includes adaptive power supply (APS) 120 and modem 109. Modem 109 further includes digital signal processor 108, CODEC 111 and AT command processor 110. Battery 104 may be any conventional type of battery such as alkaline, nickel-metal-hydride, nicad or lithium. Computer 102 may be any conventional computer system such as a hand-held personal computer or a personal information device. Computer 102 may include any conventional components such as a central processing unit, memory, and input/output interface circuitry. In the illustrated embodiment, computer system 100 includes a modem card 106. Modem card 106 provides an interface between computer 102 and a telephone line. Modem card 106 modulates, demodulates, encodes and decodes data transferred between computer 102 and telephone line 114. In the illustrated embodiment, data and control lines facilitate the transfer of data between computer 102 and modem card 106. Computer 102 additionally provides bus voltage (BUSVOLT) 116 to modem card 106. Bus voltage 116 may be used to provide power to modem card 106 when insufficient power is available from telephone line 114. In an alternative embodiment, modem card 106 may provide power to computer 102. As will be discussed in more detail below, APS 120 determines the maximum power available from telephone line 114 and calculates a power ratio based upon the maximum power available from telephone line 114 and the power required by modem 109. If modem 109 requires more power than is available from telephone line 114, APS 120 supplements the power from telephone line 114 with power from bus voltage 116. If more power is available from telephone line 114 than required by modem 109, APS 120 may provide power to computer 102. If the modem is not currently operating and thus dissipating minimal power, the majority of the power available from telephone line 114 may be supplied to computer 102.

As noted above, modem 109 includes digital signal processor (DSP) 108, AT command processor 110 and CODEC 111. DSP 108 and AT command processor 110 form a conventional modem core. DSP 108 and AT command processor 110 are conventional devices for sending and receiving data via telephone lines. CODEC 111 is coupled to transmit and receive data from telephone line 114. CODEC 111 is a conventional device for translating analog signals to digital signals and digital signals to analog signals. In the illustrated embodiment, modem 109 receives power from adaptive power source 120.

Adaptive power source 120 is connected to telephone line 114 and bus voltage 116. APS 120 determines the maximum power available from telephone line 114 and delivers that power to modem 109. If insufficient power is available from telephone line 114, APS 120 draws any additional power needed for modem 109 from bus voltage 116. In this manner, the power for modem 109 may be completely or largely supplied from telephone line 114 rather than bus voltage 116. Accordingly, the power from battery 104 required by modem 109 is either completely eliminated or substantially reduced. By reducing the power drawn from battery 104, the operating time of computer system 100 between rechargings or replacing battery 104 is substantially increased.

In one embodiment, modem card 106 is implemented on a PC-CARD standard form factor. PC-CARD is a conventional form factor standard for add-on cards of portable devices. In this embodiment, the interface between computer 102 and modem 106 is in accordance with the electrical requirements of the PC-CARD standard.

Figure 2:
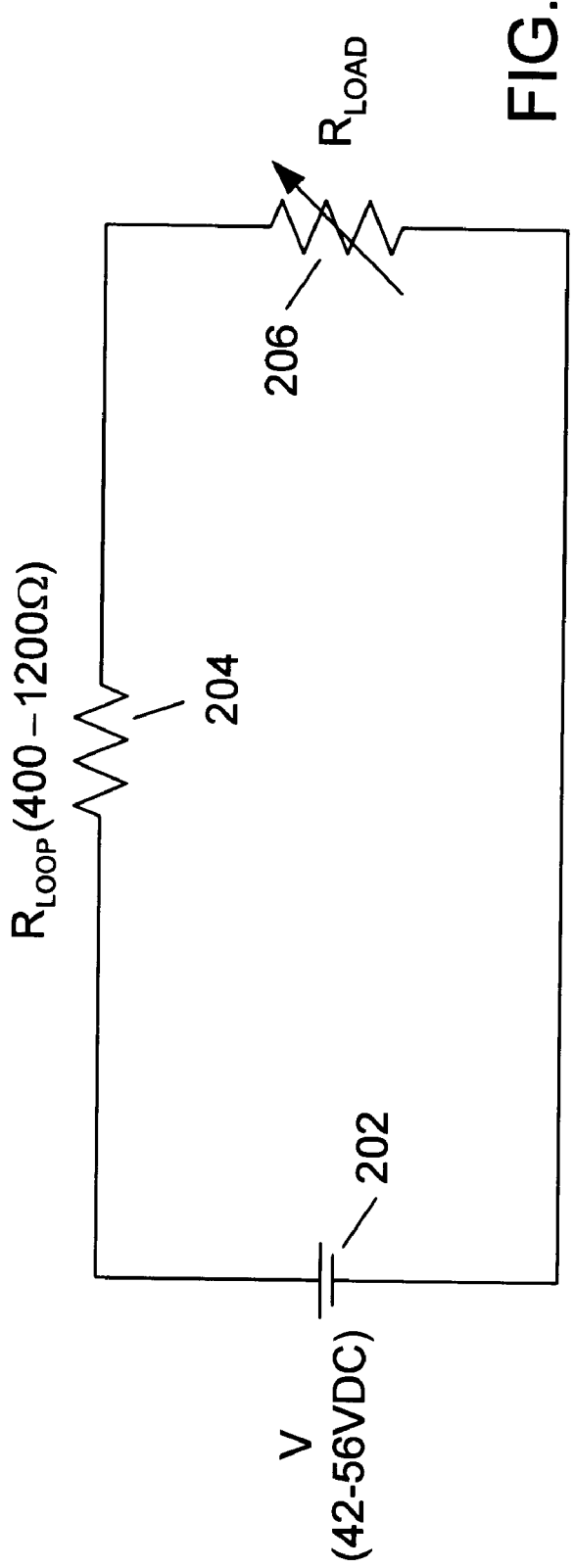
FIG. 2 is a simplified equivalent circuit of a telephone central office and telephone line.

Turning now to FIG. 2, a simplified equivalent circuit representation of a telephone system (a telephone company central office and telephone lines) is shown. The simplified circuit diagram is useful for illustrating the power available to APS 120 from the telephone line.

APS 120 is primarily affected by the direct current (DC) components within the telephone system. Accordingly, the simplified equivalent circuit representation of the telephone system is limited to DC components. The telephone system may be reasonably modeled by a voltage supply 202 connected in series with a loop resistance ($R_{loop}$) 204 and a variable resistor 206. Voltage supply 202 models the voltage output by the central office. $R_{loop}$ 204 models the resistance of the telephone line between the central office and APS 120 and the resistance of the telephone line between APS 120 and the central office. Variable resistor 206 models APS 120. The voltage level of voltage supply 202 and the resistance of $R_{loop}$ 204 is dependent upon the country in which computer system 100 is operating. For simplicity purposes, typical values for a telephone system in the United States will be used. It is apparent that the concepts are similar but the values differ for other countries, such as Canada, England, Europe and Japan. A typical voltage level for voltage source 202 is 42–56 volts. A typical value for $R_{loop}$ 204 is 400–1, 200 ohms. As discussed above, the inductive and capacitive elements of the telephone system are eliminated from the simplified circuit representation because APS 120 primarily uses the DC component of the signal on the telephone line.

In most cases, the maximum power from the telephone line is delivered to APS 120 when the resistance of variable resistance 206 is equal to the resistance of $R_{loop}$ 204. Accordingly, to obtain the maximum power from the telephone line, APS 120 attempts to adjust its effective DC input impedance to approximately equal $R_{loop}$ 204. At the same time, APS 120 must maintain a high AC input impedance to prevent degrading the audio signal on the telephone line. The audio signal on the telephone line may be the ring signal, the dial tone, or voice. Under worst case conditions (V=42 volts and $R_{loop}$=1,200 ohms), APS 120 may extract 367 milliwatts for the telephone system. Under best case conditions (V=56 volts and $R_{loop}$=400 ohms), APS 120 may extract 1,960 milliwatts of power from the telephone system.

Because the voltage at the central office and the impedance of the telephone line are both unknown, APS 120 makes two measurements to determine the loop resistance and voltage of the telephone system. In one embodiment, APS 120 adjusts its input impedance to a known value and measures the voltage at APS 120. APS 120 then changes its input impendance to a second known value and again measures the voltage at APS 120. Using the data from these two measurements, APS 120 can approximately determine both the voltage of voltage supply 202 and the impedance of $R_{loop}$ 204. APS 120 may then change its input impedance to match the impedance of $R_{loop}$ 204 and accordingly extract the maximum power available from the telephone system.

In summary, APS 120 measures the DC characteristics of the telephone system and advantageously adapts the input impedance of APS 120 to extract the maximum power available from the telephone line. It is noted that in some applications it may be desirable to extract less than the maximum power available from the telephone system. In these situations, the impedance of APS 120 may be adjusted to extract any amount of power less than the maximum available power.

As will be discussed in more detail below, APS 120 determines the power required by modem 109 and compares that power to the power available from the telephone system. If sufficient power is available from the telephone system, APS 120 provides the power to modem 109 from telephone line 114. In one particular embodiment, if more power is available from the telephone line than required by modem 109, APS 120 may provide power to computer system 102. Alternatively, if modem 109 requires more power than is available from the telephone system, APS 120 determines the power ratio of the power available from telephone line 114 to the power required by modem 109. APS 120 delivers power to modem 109 according to the power ratio determined. In other words, APS 120 delivers a portion of the power required for modem 109 from telephone line 114 and the remaining portion from bus voltage 11 6 received from battery 104. In this manner, modem 109 uses the maximum power available from the telephone line and supplements any additional required power from battery 104.

Figure 3:
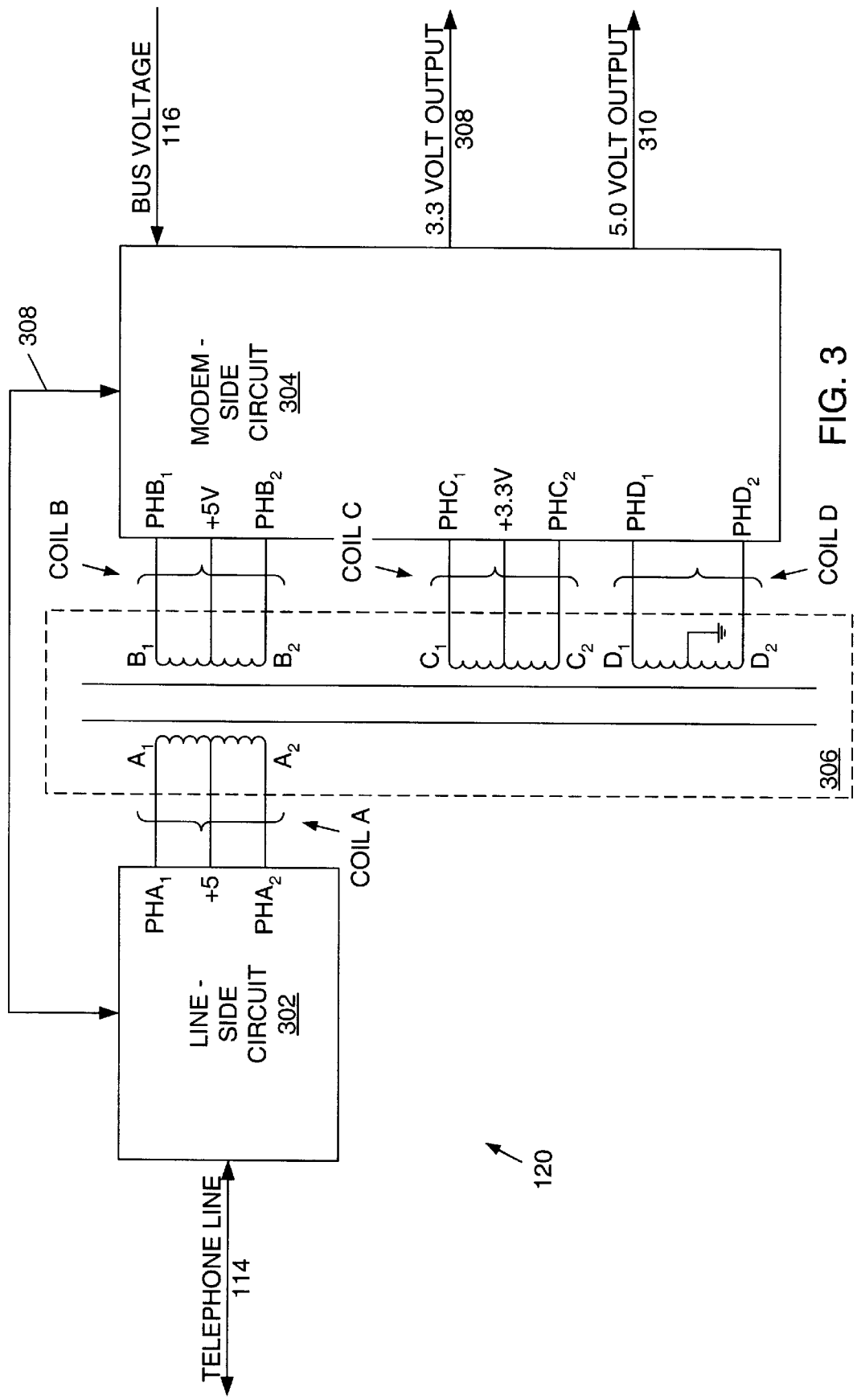
FIG. 3 is a block diagram of a transformer-based adaptive power supply according to one embodiment of the present invention.

Turning now to FIG. 3, a block diagram of APS 120 implementing a transformer-based embodiment is shown. In the illustrated embodiment, APS 120 includes a line-side circuit 302, a modem-side circuit 304 and a transformer 306. Line-side circuit 302 is coupled to telephone line 114, transformer 306 and modem-side circuit 304. Transformer 306 is coupled to line-side circuit 302 and modem-side circuit 304. Modem-side circuit 304 is coupled to line-side circuit 302, transformer 306, and bus voltage 116. Modem-side circuit 304 additionally outputs two voltage output signals: 3.3 volt output bus 308 and 5.0 volt output bus 310.

Line-side circuit 302 determines the DC characteristics of telephone line 114 and adjusts the input impedance of line-side circuit 302 to match the impedance of the telephone system. Line-side circuit 302 determines a power ratio of power available from the telephone system versus the power required by modem 109. In one embodiment, if power must be supplied from both telephone line 114 and bus voltage 116, APS 120 uses power time division multiplexing to share the power between two sources. Power time division multiplexing is discussed in more detail below in reference to FIG. 4. In simple terms, line-side circuit 302 and modem-side circuit 304 alternate inducing energy into transformer 306 based upon the calculated power ratio. If the power available from the telephone system is 75% of the required power, line-side circuit 302 induces energy from the telephone system into transformer 306 seventy-five percent of the time and modem-side circuit 304 induces energy into transformer 306 the remaining twenty-five percent of the time.

In one embodiment, line-side circuit 302 adapts the impedance of the circuit to obtain the maximum power from telephone line 114. Line-side circuit 302 rectifies the DC portion of the telephone signal and outputs a regulated 5.0 volt signal to the center-tap of coil A of transformer 306. Line-side circuit 302 transfers energy to transformer 306 by alternately grounding coil terminals $A_1$ and $A_2$. Based upon the maximum power available from telephone line 114 and the power ratio, line-side circuit 302 may continually induce energy into transformer 306 or may intermittently induce energy into transformer 306. In another embodiment, line-side circuit 302 extracts energy from transformer 306. For example, during a cold restart sequence, line-side circuit 302 may rectify a signal from transformer 306 and provide power to the components of line-side circuit 302. After the completion of restart sequence, line-side circuit 302 may begin inducing power to transformer 306.

Modem-side circuit 304 is configured to induce energy into transformer 306 and/or extract energy from transformer 306. Depending upon the voltage level of bus voltage 116, modem-side circuit 304 may induce energy into a coil of transformer 306 or extract energy from a coil of transformer 306. For example, in one embodiment, if bus voltage 116 is at 5.0 volts, modem-side circuit 304 induces energy into coil B of transformer 306 and extracts energy at 3.3 volts from coil C of transformer 306. In one embodiment, coil D is used to gate circuits of a synchronous rectifier coupled to coil C. In one embodiment, the circuitry of modem 109 is primarily powered from 3.3 volt bus 308. In this embodiment, the power requirement on 5.0 volt bus 310 is minimal and 5.0 volt bus 310 is powered directly from bus voltage 116.

In an alternative embodiment, bus voltage 116 is at 3.3 volts. In this embodiment, line-side circuit 302 induces energy into transformer 306 via coil A. As in the previous embodiment, line-side circuit 302 induces energy into transformer 306 for a period determined by the power available from telephone line 114 and the power ratio determined by line-side device 302. Modem-side circuit 304 extracts energy from coil C of transformer 306 for a period of time also determined by the power ratio. When modem-side device 304 is not outputting energy from transformer 306, 3.3 volt output bus 308 is coupled directly to bus voltage 116. Accordingly, a portion of the power output on 3.3 volt output bus 308 is provided by telephone line 114 and a portion is provided from bus voltage 116.

In still another embodiment, line-side circuit 302 may output power from transformer 306 via coil A. In this embodiment, energy may be induce to transformer 306 from transformer coil B, transformer coil C or both.

Figure 4:
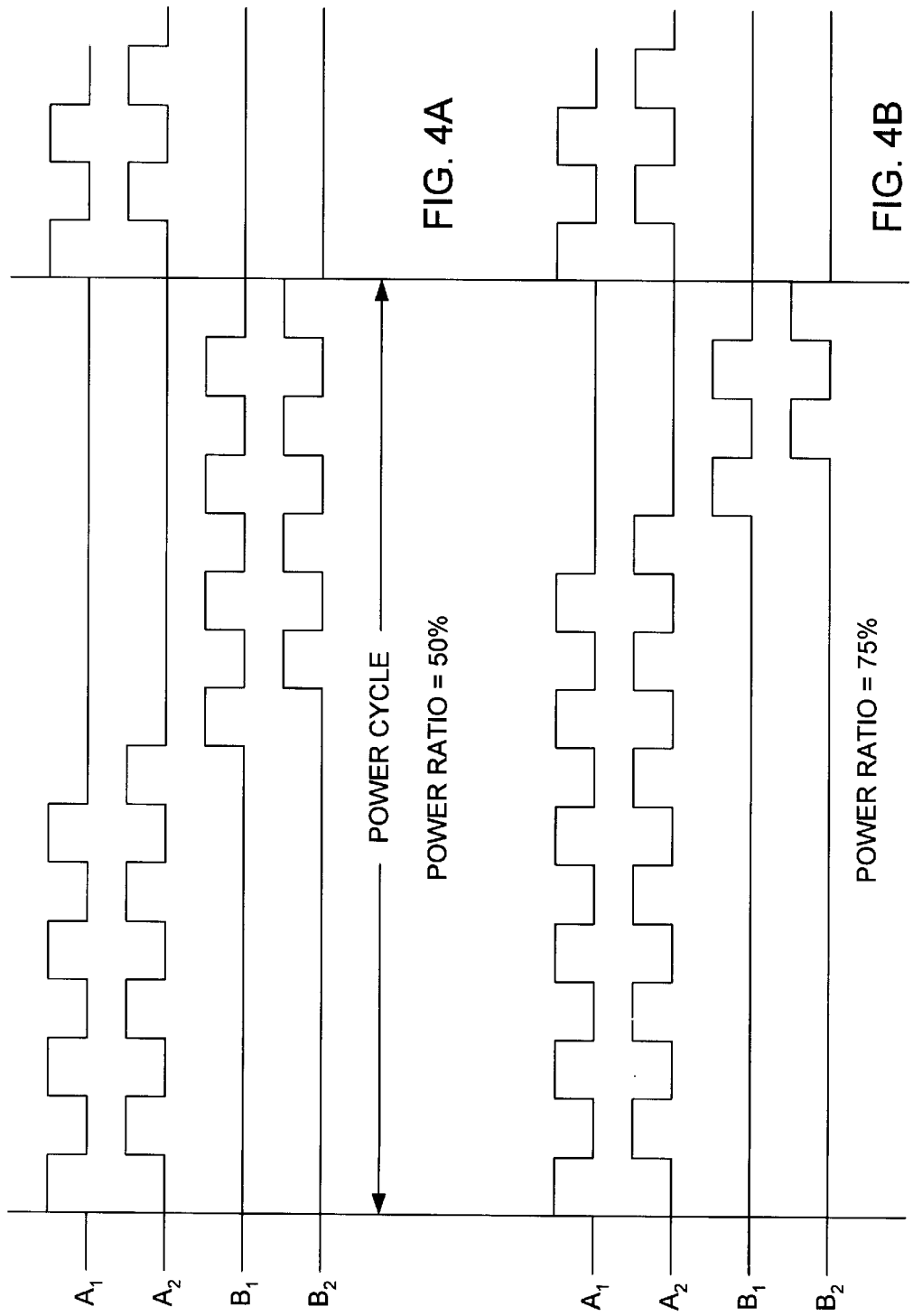
FIGS. 4A–4B is a timing diagram illustrating power time division multiplexing according to one embodiment of the present invention.

Turning now to FIG. 4, timing diagrams illustrating power time division multiplexing are shown. As discussed above, power time division multiplexing is a method of combining power from two different power sources. A power ratio determines the relative portions of a predetermined period of time during which each source provides power. The pre-defined period is called a power cycle. The power cycle determines a period during which multiple sources alternatively supply power. In FIG. 4A, a timing diagram of the control signals to coil A and B of transformer 306 are shown for a power ratio of 50%. In the illustrated embodiment, the power cycle is eight clock cycles. In the illustrated embodiment, the terminals of coil A are alternately asserted for four clock cycles. During the first four clock cycles, energy is induced into transformer 306 via coil A. During the next four clock cycles, control signals $PHA_1$ and $PHA_2$ are de-asserted. Accordingly, no energy is induced to transformer 306 from coil A during clock cycles five through eight. Control signals $PHB_1$ and $PHB_2$, however, are alternately asserted during clock cycles five through eight. Accordingly, energy is induced into transformer 306 via coil B during clock cycles five through eight. At the end of the power cycle, the pattern repeats. In other words, energy is induced into transformer 306 via coil A for clock cycles nine-twelve, and then energy is induced to transformer 306 via coil B for the next four clock cycles. It is noted, that the selection of an eight clock cycle period is for illustrative purposes only. The designer may choose a shorter or longer time period in which to distribute the load. The important relationship is the ratio of the number of clock cycles in which one input is active versus the number of clock cycles in which the other input is active.

Turning now to FIG. 4B, a timing diagram of the control signals to coil A and B for a power time division multiplexing scheme with a power ratio of 75% is shown. In the illustrated embodiment, control signals $PHA_1$ and $PHA_2$ are active for six clock cycles and control signals $PHB_1$ and $PHB_2$ are active for two clock cycles. In the illustrated embodiment, the first power source provides 75% of the energy to the transformer and the second power source provides 25% of the energy to the transformer. It is apparent, that a designer may accommodate any power ratio by adjusting the number of clock cycles during which each power source provides energy to the transformer and the length of the power cycle.

Figure 5:
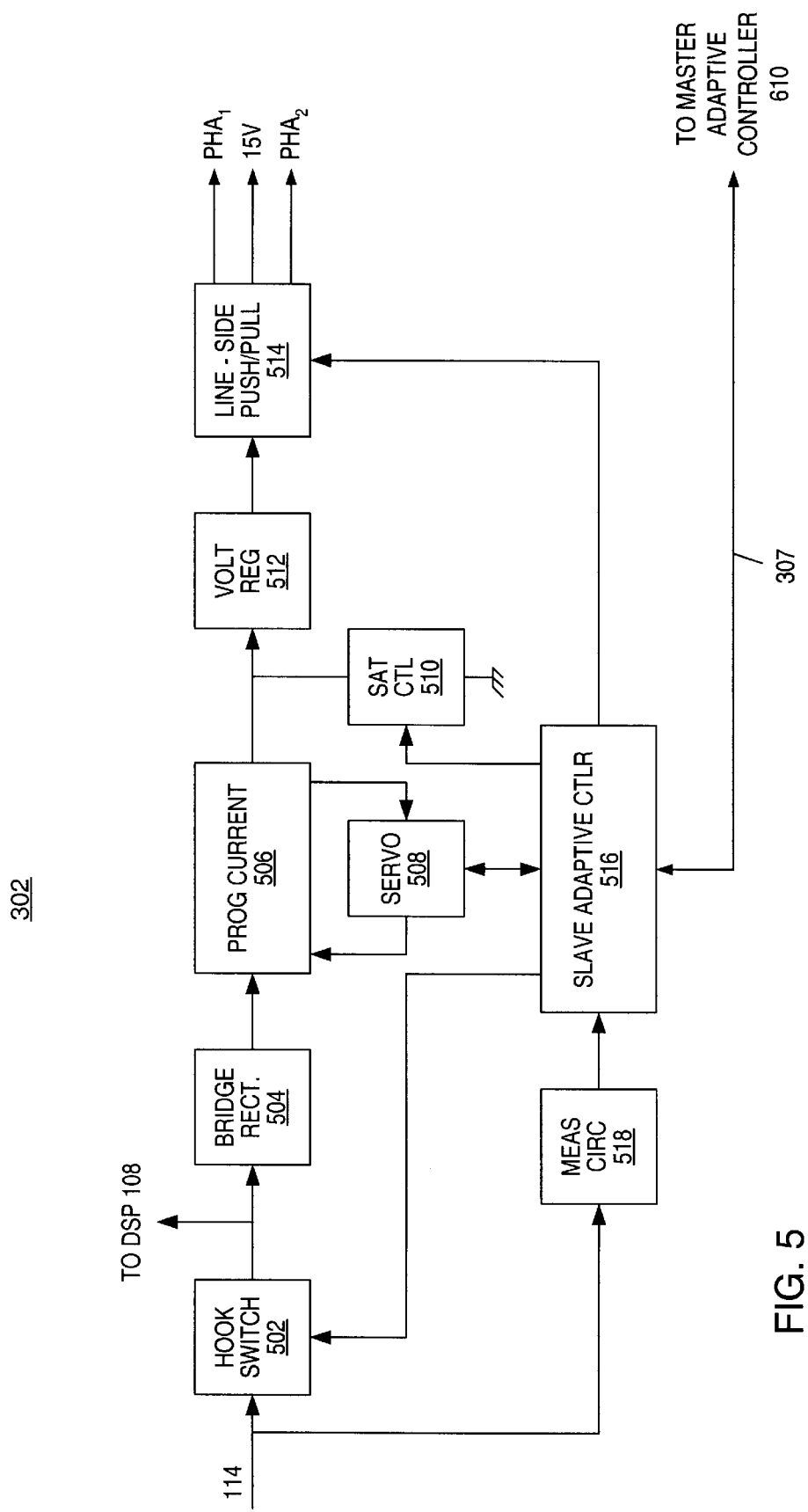
FIG. 5 is a block diagram of a modem-side circuit of a transformer-based adaptive power supply according to one embodiment of the present invention.

Turning now to FIG. 5, a block diagram of line-side circuit 302 according to one embodiment of the present invention is shown. Line-side circuit 302 includes hook switch 502, bridge rectifier 504, programmable current source 506, current servo 508, saturation control 510, voltage regulator 512, line-side push-pull switch 514, slave adaptive controller 516 and measurement circuit 518. Telephone line 114 is coupled to hook switch 502. Bridge rectifier 504 rectifies the output of hook switch 502 and provides the telephone signal to programmable current source 506. Current servo 508 is coupled to programmable current source 506. Saturation control 510 is coupled between programmable current source 506 and line-side ground. Voltage regulator 512 is coupled to the output of programmable current source 506 and outputs a regulated voltage to line-side push-pull switch 514. Line-side push-pull switch outputs 5.0 volts to a center-tap of coil A of transformer 306 and outputs control signals $PHA_1$ and $PHA_2$ to terminals of coil A of transformer 306. Slave adaptive controller 516 outputs control signals to hook switch 502, programmable current source 506 and saturation control circuit 510. Slave adaptive controller 516 is coupled to measurement circuit 518.

Telephone line 114 is coupled to an input of hook switch 502. Telephone line 114 typically carries a DC signal with an audio signal modulated on the DC signal. Hook switch 502 is coupled to an off-hook control signal and an on-hook control signal from slave adaptive controller 516. When the on-hook control signal is asserted (in other words, the device is in an on-hook condition), hook switch 502 is an open circuit and no current flows from telephone line 114 to line-side circuit 302. Alternatively, when the off-hook control signal is asserted, hook switch 502 is closed and the signal on telephone line 114 is provided to bridge rectifier 504. The output of hook switch 502 is additionally coupled to modem 109. The audio portion of the signal on telephone line 114 is the audio signal used by modem 109. The DC portion of the signal on telephone line 114 is provided to bridge rectifier 504. Hook switch 502 is discussed in more detail below in reference to FIG. 7.

Bridge rectifier 504 outputs a signal with the same polarity regardless of the polarity of the input signal. For example, if the tip signal is more positive than the ring signal, bridge rectifier 504 will not change the polarity of the input signal. If, however, the ring signal is more positive than the tip signal, bridge rectifier 504 will invert the polarity of the tip and ring signal. Bridge rectifier 504 is discussed in more detail below in reference to FIG. 8.

Programmable current source 506 is programmed to extract a constant current for telephone line 114. The current level is set by control signals from slave adaptive controller 516 and current servo 508. To extract maximum power, the effective DC resistance of current source 506 should match the loop resistance of the telephone line 114. Programmable current source 506 outputs a constant current to a bank of capacitors which store the energy for use by voltage regulator 512. While the effective DC resistance varies with the current level, programmable current source 506 maintains a high AC input impedance so the audio portion of the telephone signal is not degraded. Programmable current source 506 is discussed in more detail below in reference to FIG. 9.

Current servo 508 is coupled to programmable current source 506. Current servo 508 is a feedback control circuit that adjusts the setting of programmable current source 508 to maintain the desired loop current. Current servo 508 is discussed in more detail below in reference to FIG. 10.

Saturation control circuit 510 clamps the voltage output of programmable current source 506 to prevent the saturation of the transistors at the output of programmable current source 506. The voltage at which saturation control circuit 510 clamps the output of programmable current source 506 is set by slave adaptive controller 516. In one embodiment, slave adaptive controller 516 sets the voltage of saturation control circuit 510 at a voltage slightly less than the voltage output of bridge rectifier 504. Saturation control circuit 510 is discussed in more detail below in reference to FIG. 11.

Voltage regulator 512 is coupled to the output of programmable current source 506. The magnitude of the voltage output by programmable current source 506 varies in dependence upon the conditions of telephone line 114 and the load of voltage regulator 512. Voltage regulator 512 outputs a constant voltage from the varying input voltage. In one embodiment, the constant voltage output by voltage regulator 512 is 5.0 VDC. In one embodiment, the output of programmable current source 506 may vary from 8 volts to 24 volts. Voltage regulator 512 efficiently reduces the voltage to 5.0 volts and outputs that voltage to line-side push-pull switch 514. The 5.0 volt signal may additionally be used to provide power to the components of line-side circuit 302. Voltage regulator 512 is discussed in more detail below in reference to FIG. 12.

Line-side push-pull switch 514 chops the 5.0 volt signal received from voltage regulator 512 and outputs a 5.0 volt square wave to transformer 306. Line-side push-pull switch 514 outputs a 5.0 VDC signal, which is coupled to the center-tap of transformer coil A, and two control signals coupled to terminals of coil A. By alternately grounding one coil terminal, an alternating current waveform is induced to transformer 306. Control signals $PHA_1$ and $PHA_2$ are typically square waves that alternately ground one terminal of the transformer coil.

In an alternative embodiment, line-side push-pull switch rectifies an AC waveform present at coil A and outputs a direct current signal to provide power to components of line-side circuit 302. Line-side push-pull switch 514 is discussed in more detail below in reference to FIG. 13.

Slave adaptive controller 516 is coupled to measurement circuit 518. Measurement circuit 518 performs the necessary parameter measurements to determine the DC characteristics of telephone line 114. As discussed above, based upon the DC characteristics of telephone line 114, a power ratio is determined. The measurement data additionally is used to appropriately program programmable current source 506. Slave adaptive controller 516 outputs control signals to current servo 508 to set the appropriate current to draw from telephone line 114 based upon the voltage measurements. Slave adaptive controller 516 additionally outputs control signals to line-side push-pull switch 514 to control the energy induced or extracted from transformer 306, and to saturation control 508 to program the clamping voltage. Slave adaptive controller 516 communicates to master adaptive controller 610 via control line 307. Slave adaptive controller 516 is discussed in more detail below in reference to FIG. 14.

Figure 6:
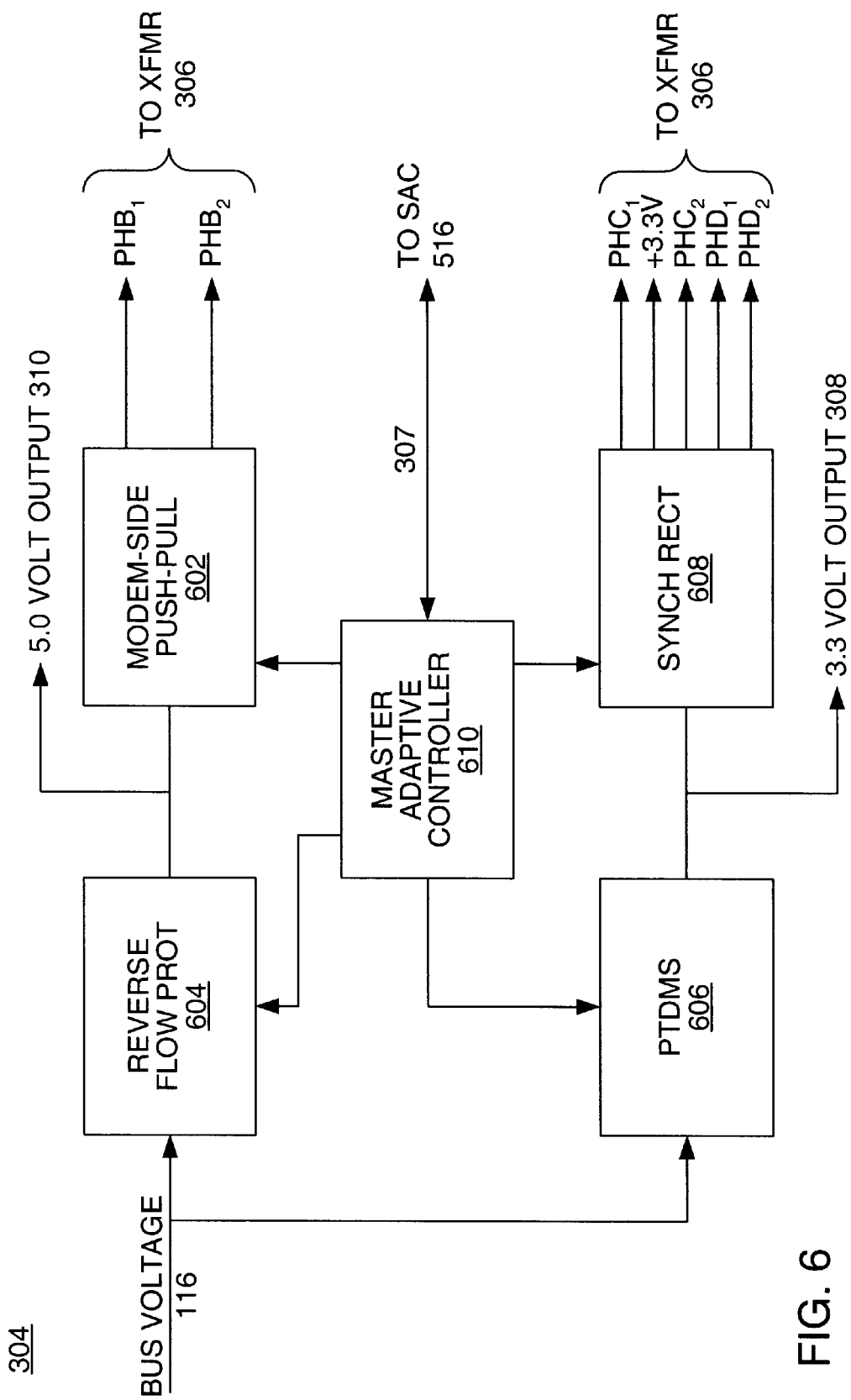
FIG. 6 is block diagram of a line-side circuit of a transformer-based adaptive power supply according to one embodiment of the present invention.

Turning now to FIG. 6, a block diagram of modem-side circuit 304 according to one embodiment of the present invention is shown. Modem-side circuit 304 includes modem-side push-pull switch 602, reverse flow protector 604, power time division multiplex switch 606, synchronous rectifier 608 and master adaptive controller 610. Modem-side push-pull switch 602 is coupled to induce or extract energy from transformer 306 via coil B. Reverse flow circuit 604 is coupled between bus voltage 116 and modem-side push-pull switch 602. Power time division multiplex switch 604 is coupled between bus voltage 116 and 3.3 volt output bus 308. Synchronous rectifier 608 is coupled to induce or extract power from transformer 306 via coils C and D and to output power on 3.3 volt output bus 308. Master controller 610 provides control signals to modem-side push-pull switch 602, reverse flow protector 604, power time division multiplex switch 606 and synchronous rectifier 608. Master adaptive controller 610 is coupled to slave adaptive controller 516 via control line 307.

Modem-side push-pull switch 602 is configured to either induce energy to transformer 306 or extract energy from transformer 306 depending upon the configuration of APS 120. In one embodiment, bus voltage 116 is at 5.0 volts and telephone line 114 cannot provide sufficient power for modem 106. In this embodiment, modem-side push-pull switch 602 induces energy to transformer 306. The power from bus voltage 116 is provided to modem-side push-pull switch 602 from reverse flow protector 604. Modem-side push-pull switch provides the 5.0 VDC signal to the center-tap of a coil B of transformer 306. Modem-side push-pull switch 602 is additionally coupled to two terminals of coil B. Modem-side push-pull switch 602 alternately grounds one end terminal of coil B at a time. This induces an alternating current signal to the transformer coil and accordingly induces energy into the transformer. In this embodiment, 5.0 volt output bus 310 is powered directly from bus voltage 116.

In an alternative embodiment, bus voltage 116 is a 3.3 volt signal. In this embodiment, modem-side push-pull switch 602 is configured to extract energy from transformer 306 and output power to 5.0 volt output bus 310. An alternating current signal is present at coil B of transformer 306. Modem-side push-pull switch 602 rectifies and filters the AC signal and outputs the signal on 5.0 volt output bus 310. Modem-side push-pull switch 602 is discussed in more detail below in referenced to FIG. 15.

Reverse flow protector 604 is coupled between bus voltage 116 and modem-side push-pull switch 602. Reverse flow protector 604 prevents current flow from 5.0 volt output bus 310 to bus voltage 116 when bus voltage 116 is at 3.3 volts. When bus voltage 116 is at 5.0 volts, reverse flow protector 602 is effectively a closed switch that allows current flow from bus voltage 116 to modem-side push-pull switch 602. Master adaptive controller 610 detects the voltage level of bus voltage 116 and outputs the appropriate control signal to reverse flow protector 604. Reverse flow protector 604 is discussed in more detail below in reference to FIG. 16.

Power time division multiplex switch (PTDMS) 606 is coupled between bus voltage 116 and 3.3 volt output bus 308. If bus voltage 116 is at 5.0 volts, PTDTMS is effectively an open switch that isolates bus voltage 116 from 3.3 volt output bus 308. Alternatively, if bus voltage 116 is at 3.3 volts, PDTMS 606 couples bus voltage 116 to 3.3 volt output bus 308 for a period determined by the power ratio. As discussed above, telephone line 114 may not provide sufficient power for modem 106. If bus voltage 116 is 5.0 volts, the additional power for modem 109 may be induced into transformer 306 by modem-side push-pull switch 602, and the power extracted by synchronous rectifier 608. If bus voltage 116 is at 3.3 volts, synchronous rectifier 608 extracts the power from transformer 306 for a period of time and power time division multiplex switch 606 couples bus voltage 116 directly to 3.3 volt output bus 308 for a period of time. For example, if the power ratio is 75%, synchronous rectifier 608 may extract power from transformer 306 for 75% of a predefined power cycle. During the time synchronous rectifier 608 is extracting power from transformer 306, PDTMS 606 is open. For the remaining 25% of the predefined period, synchronous rectifier 608 is inactive and PDTMS 606 couples bus voltage 116 directly to 3.3 volt output bus 308 and accordingly supplies the needed power. Master adaptive controller 610 outputs the appropriate control signal to couple bus voltage 116 to 3.3 volt output bus 308 for a period of time dictated by the power ratio. PTDMS 606 is discussed is more detail below in reference to FIG. 17.

Synchronous rectifier 608 is configured to induce energy into transformer 306 or to extract energy from transformer 306. As discussed above, synchronous rectifier 608 may extract energy from transformer 306 and output power on 3.3 volt output bus 308. Synchronous rectifier 608 alternately grounds one terminal of coil C as the current flow alternates through the coil. Synchronous rectifier 608 is additionally coupled to coil D of transformer 306 which is used by synchronous rectifier 608 to control the grounding of the terminals of the coil C.

In an alternative embodiment, synchronous rectifier 608 induces energy to transformer 306. In this embodiment, 3.3 volts from bus voltage 116 is provided to the center-tap of coil C and synchronous rectifier 608 alternately grounds the terminals of coil C to induce an alternating current to transformer 306. Synchronous rectifier 608 is discussed in more detail below in reference to FIG. 18.

FIGS. 7–19 are schematic diagrams of circuits shown in FIGS. 5, 6, 20 and 21. The schematic diagrams illustrate a preferred embodiment for each circuit. The present invention, however, contemplates any conventional circuits that capture the spirit and scope of the claims attached hereto. FIG. 7–19 may include example component values or component part numbers. These component values and component part numbers represent values and part numbers according to one embodiment of the present invention. In alternate embodiments, other values and part numbers may be employed.

Figure 7:
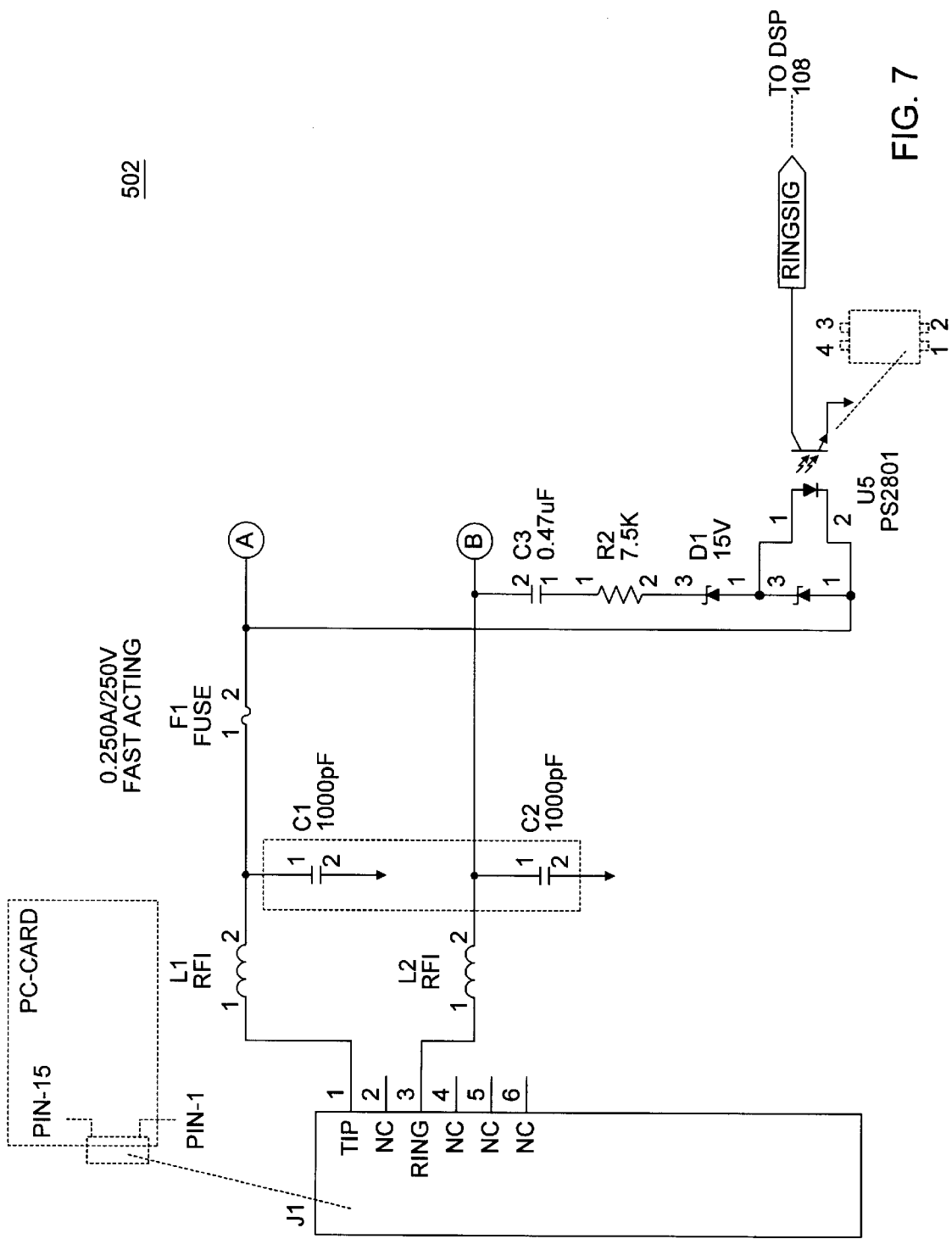
FIG. 7 is a schematic diagram of a hook switch according to one embodiment of the present invention.
Figure 7:
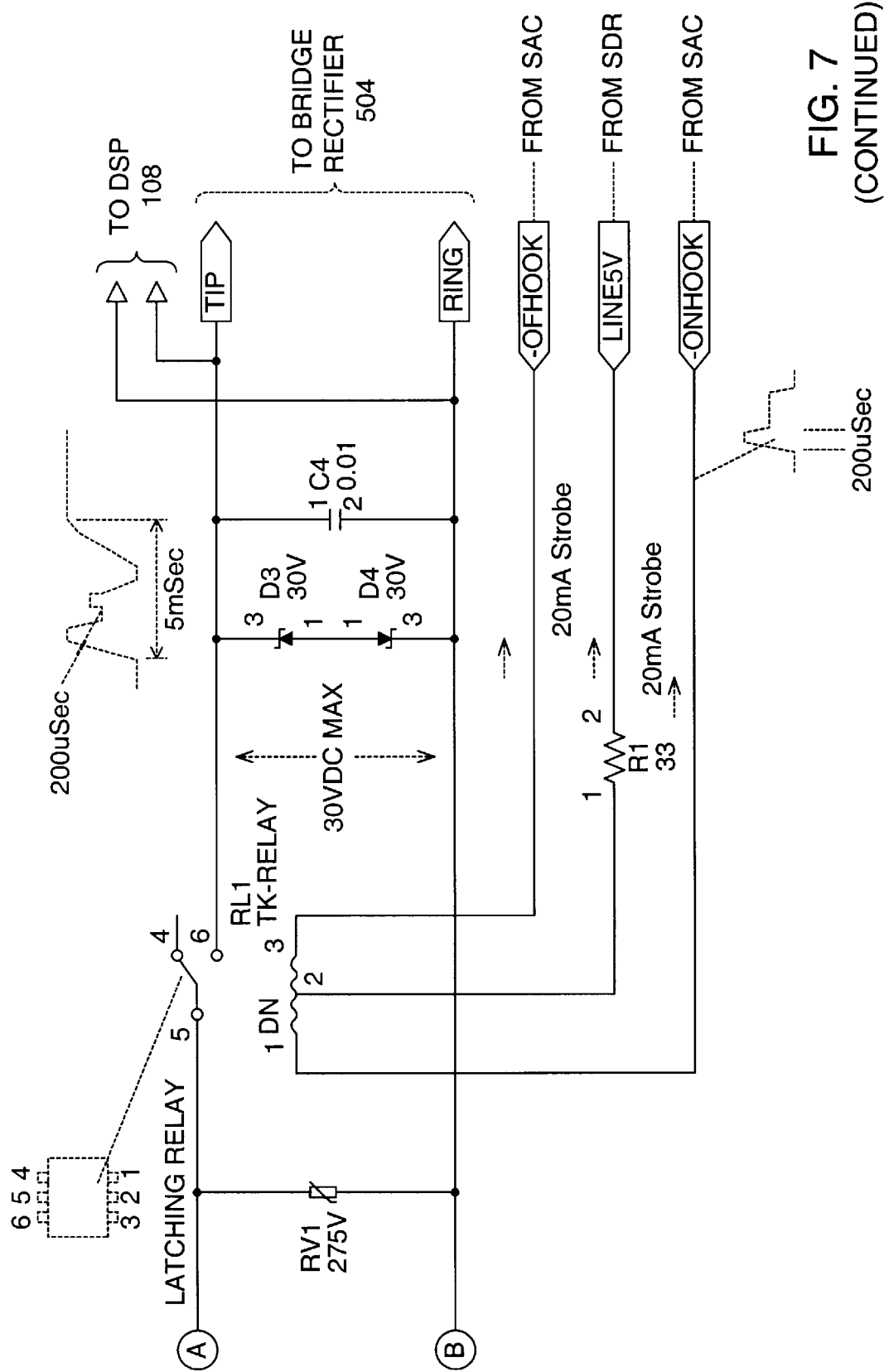

Turning now to FIG. 7, a schematic diagram of hook switch 502 according to one embodiment of the present invention is shown. Hook switch 502 includes connector J1, inductors L1–L2, capacitor C1–C4, fuse F1, transient suppresser RV1, latching relay RL1, zener diodes D1–D4, optocoupler U5, and resistors R1 and R2.

Connector J1 is a user connector for coupling hook switch 502 to telephone line 114. Connector J1 includes a tip and ring input for analog telephone signals.

Inductors L1 and L2 and capacitors C1, C2 and C4 form a low-pass filter which attenuates frequencies above the desired audio range of the telephone signal. In one embodiment, the cut-off frequency of the low-pass filter is 3400 hertz.

Fuse F1 is a standard fast-acting fuse that prevents a short circuit from damaging either modem card 106 or the telephone system. Transient suppresser RV1 protects modem card 106 from voltage transients in access of 275 volts on telephone line 114.

Latching relay RL1 is a latching mechanical relay with two control coils. The set coil is coupled to an off-hook control signal (OFHOOK) received from slave adaptive controller 516. The reset coil is coupled to an on-hook signal (ONHOOK) received from slave adaptive controller 516. When modem 109 is in a on-hook condition, RL1 is reset and the tip signal from connector J1 is coupled to a floating terminal. Alternatively, when modem 109 is in an off-hook condition, latching relay RL1 is set and the tip signal from connector J1 is coupled to bridge rectifier 504 and modem 109. In the illustrated embodiment, latching relay RL1 is controlled by a 20 milliamp strobe to either the set coil or reset coil. A center-tap of the control coil is coupled to 5.0 volts through resistor R1. The state of latching relay RL1 is changed by grounding either the on-hook or off-hook control signal for a predefined period of time. It is noted, that latching relay RL1 is included for illustrative purposes only. Any conventional mechanical or electrical switch may be implemented. The purpose of using a latching relay is to reduce the power consumption of the set and reset coil.

Zener diodes D3 and D4 clamp the line voltage between the tip and ring signal. In the illustrated embodiment, D3 and D4 clamp the voltage between tip and ring to 30 volts direct-current (VDC).

Resistor R2, capacitor C3, diodes D1 and D2 and optiocoupler U5 form a conventional ring detector circuit. The ring detector circuit detects an AC ring signal on telephone line 114 and outputs a square wave ring signal to DSP 108. The DSP ring signal (RINGSIG) is coupled to a source voltage through a pull-up resistor which is not shown.

The tip and ring output signals of hook switch 502 are coupled to bridge rectifier 504 and modem 109. The DC component of the tip and ring signal is rectified by bridge rectifier 504 and provides power to APS 120. The audio portion of the telephone signal is conveyed to modem 109.

Figure 8:
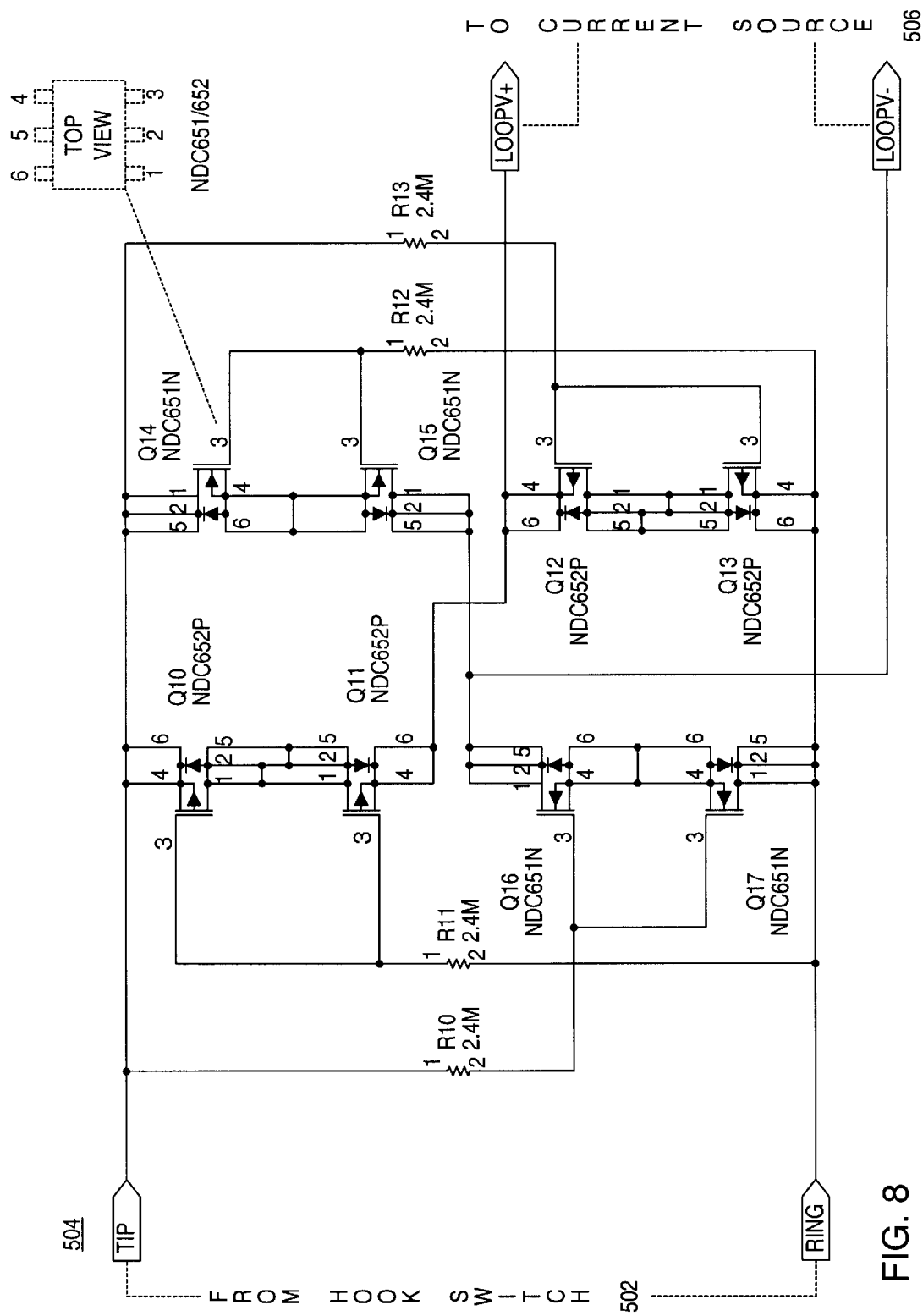
FIG. 8 is a schematic diagram of a low-loss bridge rectifier according to one embodiment of the present invention.

Turning now to FIG. 8, a schematic diagram of bridge rectifier 504 is shown according to one embodiment of the present invention. In the illustrated embodiment, bridge rectifier 504 includes p-channel MOSFETs Q10–Q13, n-channel MOSFETs Q14–Q17 and resistors R10–R13. Bridge rectifier 504 advantageously rectifies the voltage between the tip and ring inputs with minimal power loss. Bridge rectifier 504 outputs a positive voltage between terminals LOOPV+ and LOOPV− regardless of the polarity of the input between the tip and the ring signal. In other words, bridge rectifier 504 inverts the polarity of the signal between the tip and ring input if the ring input is more positive than the tip input.

When tip is more positive than ring, the gates of Q10 and Q11 are negative with respect to their sources and Q10 and Q11 enter a low impedance state (or on-state). Q10 and Q11 couple the tip input to the LOOPV+ output and supply positive current to the load coupled between LOOPV+ and LOOPV−. The gates of n-channel MOSFETs Q16 and Q17 are positive with respect to their sources. Accordingly, Q16 and Q17 are also in a low impedance state and couple LOOPV− to the ring signal, which provides a return path for the current delivered to the load coupled between LOOPV+ and LOOPV−.

When ring is more positive than tip, the gate of p-channel MOSFETs Q12 and Q13 are negative with respect to their sources. Accordingly, Q12 and Q13 enter a low impedance state and the ring terminal is coupled LOOPV+. In this configuration, the ring signal provides positive current to the load coupled between LOOPV+ and LOOPV−. The gates of n-channel MOSFETs Q14 and Q15 are positive with respect to their sources. Accordingly, Q14 and Q15 are in a low impedance state and couple the tip input signal to LOOPV−. The tip signal becomes the return path for the current delivered to the load.

Resistors R10–R13 limit the current dissipation in the gates of Q10–Q17. In the illustrated embodiment, R10–R13 are large resistors (2.4 MOhms). The high resistance value reduces the power dissipation of bridge rectifier 504, but limits the response time of Q10–Q17. Because bridge rectifier 504 is designed to rectify a DC signal, response time is not critical.

Each branch of bridge rectifier 504 includes two MOSFETs. The MOSFETs are configured back-back-back (i.e., the drain of one MOSFET is coupled to the drain of the other MOSFET). In the illustrated embodiment, back-to-back MOSFETs are required because of the MOSFET substrate diodes. The substrate diodes create a current path from drain to source. By connecting the MOSFETs back-to-back, current cannot flow through the pair of back-to-back MOSFET when they are in high impedance state (or off-state). For example, assume Q11 is eliminated from bridge rectifier 504. When ring is more positive than tip, transistors Q12–Q15 are in a low impedance state and Q10, Q16 and Q17 are in a high impedance state. Without Q11, a low impedance path would exist between ring and tip through Q12, Q13 and the substrate diode of Q10. The use of back-to-back MOSFETs eliminates this low impedance path and insures that no current flows through Q10 when it is in an off-state.

In the illustrated embodiment, the total power loss to rectify the input signal is approximately 1 milliwatt. This is a significant improvement over a conventional schottky diode bridge rectifier which has a typical power loss of approximately 100 milliwatts.

Figure 9:
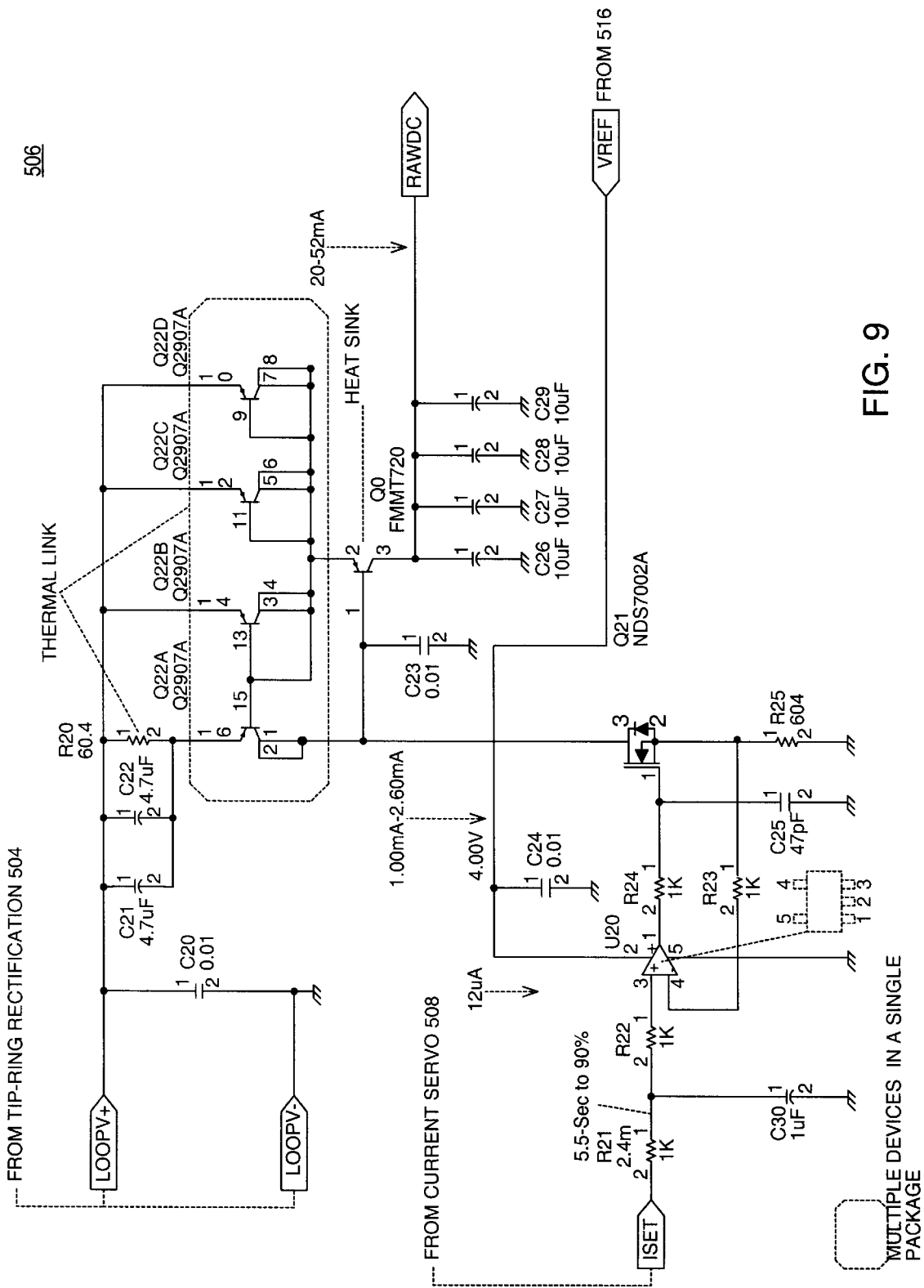
FIG. 9 is a schematic diagram of a programmable current source according to one embodiment of the present invention.

Turning now to FIG. 9, a schematic diagram of programmable current source 506 is shown according to one embodiment of the present invention. Programmable current source 506 receives the rectified telephone signal from bridge rectifier 504. The current source outputs a programmable constant current from transistor Q20. The current is stored in a bank of capacitors (C26–C29) and outputs a DC voltage that varies depending upon the current level of the current source and the load from voltage regulator 512. Programmable current source 508 includes capacitors C20–C30, resistors R20–R25, bipolar transistors Q20 and Q22, MOSFET Q21, and opamp U20.

Generally speaking, programmable current source 506 filters the telephone line signal to extract the direct current component. The DC component of the signal is provided to a current mirror including Q20 and Q22. The current level of the current mirror is set by a reference circuit including U20 and Q21. The current output from the current mirror is stored in a bank of capacitors. The capacitors serve as a reservoir for energy upon which voltage regulator 512 may draw. In one embodiment, the current level of programmable current source 506 is determined by the maximum power available from telephone line 114. As discussed above, slave adaptive controller 516 determines the maximum power available from telephone line 114. Based upon the maximum power available from the telephone line, the maximum current available from telephone line 114 is determined. Programmable current source 506 is programmed for a constant current equal to or less than the maximum current. When programmable current source 506 is set for the maximum current, the effective DC resistance of programmable current source 506 is approximately equal the resistance of telephone line 114. Programmable current source 506, however, maintains a high AC input impedance so that the audio portion of the telephone signal is not degraded.

Programmable current source 506 receives an input signal from the LOOPV+ and LOOPV− input terminals. The LOOPV− input terminal is coupled to line ground. Line ground is the reference signal for the line-side portion of APS 120. Capacitor C20 is coupled between LOOPV+ and LOOP−. Capacitor C20 is part of the low-pass filter described above in reference to FIG. 7. Capacitor C21 and C22 and resistor R20 form a second low-pass filter. The second low-pass filter has a lower cut-off frequency than the previous low-pass filter and is designed to increase the effective impedance of the current source at all frequencies.

Transistors Q22A–Q22D and Q20 are configured as a modified Wilson current mirror. The current at the collector of Q20 is a multiple of the current at the collector of Q22A. In the illustrated embodiment, the current ratio is set to 20. Accordingly, the current at the collector of Q20 is twenty times the current at the collector of Q22A. The modified Wilson current mirror provides a programmable current source with a high AC input impedance. In the illustrated embodiment, the current mirror operates in an open-loop configuration. The feedback control is performed through slave adaptive controller 516. The open loop configuration of the current mirror increases the response time of programmable current source 506.

The current output from the collector of Q22A is determined by a current reference circuit which includes resistors R21–R25, capacitors C24, C25 and C30, MOSFET Q21 and opamp U20. Opamp U20 operates as a comparator. The output of opamp U20 adjusts the impedance of Q21 such the voltage drop across R25 is equal to the voltage at the ISET input terminal. R21 and C30 and R24 and C25 comprise low-pass filters which limits the slew rate of the output of U20. C24 is a bypass capacitor that minimizes fluctuations in the supply voltage to U20.

The current flow through R25 is approximately equal to ISET/R25. This current is also equal to the current flow through Q21 and approximately equal to the current flow through the collector of Q22A. As discussed above, the current from the collector of Q20 is equal to a multiple of the current through Q22A. Accordingly, by adjusting the ISET signal, the current output from the collector of Q20 may be set. The ISET signal is an output of current servo 508 which is discussed in more detail below in reference to FIG. 10.

The current output from Q20 is input to a bank of capacitors C26–C29. In the illustrated embodiment, the capacitor bank is 40 microfarads. In one particular embodiment, four capacitors are used to obtain a total capacitance of 40 microfarads for a given component height (less than 2.5 mm). Capacitors C26–C29 store the current output from Q20 and act as an energy reservoir upon which voltage regulator 512 may draw energy. The voltage at the RAWDC output terminal may vary depending upon the telephone line conditions (i.e., the current level of the current source) and the power ratio determined by the adaptive controllers (i.e., the load from voltage regulator 512). In the illustrated embodiment, the voltage level of RAWDC may vary between 8 VDC and 24 VDC.

Figure 10:
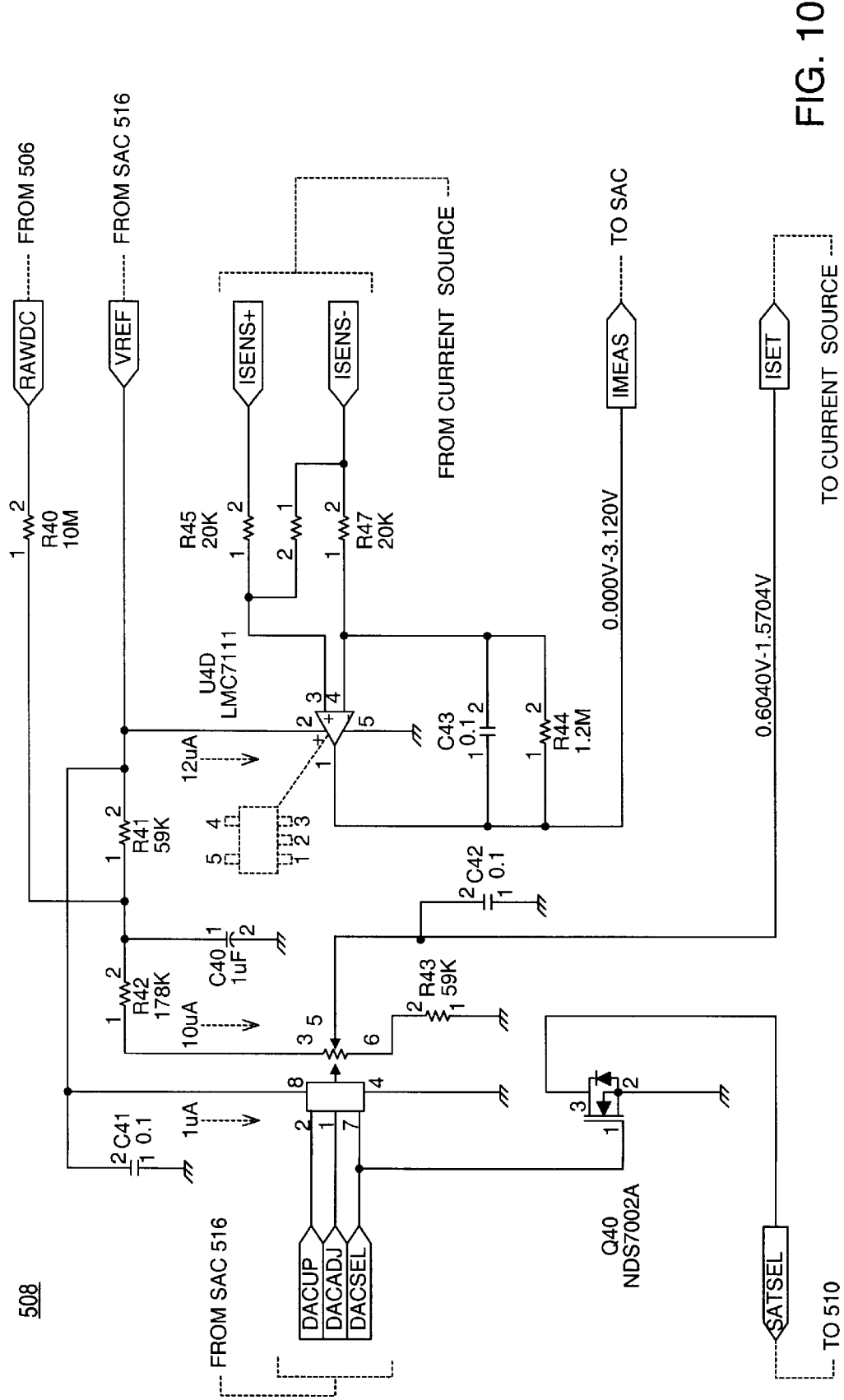
FIG. 10 is a schematic diagram of a current servo according to one embodiment of the present invention.

Turning now to FIG. 10, a schematic diagram of current servo 508 is shown according to one embodiment of the present invention. Current servo 508 senses the current output from programmable current source 506, outputs a signal to slave adaptive controller 516 indicative of the current level and receives control signals from slave adaptive controller 516 to adjust ISET. As discussed above, ISET sets the current level of programmable current source 506. Current servo 508 includes resistors R40-R47, capacitors C40–C42, opamp U40, MOSFET Q40, and electronic potentiometer U41.

Opamp U40 is configured as a differential DC amplifier that amplifies a current sense voltage and outputs an IMEAS signal to slave adaptive controller 516. The IMEAS signal is a voltage signal indicative of the current output from programmable current source 506. In the illustrated embodiment, resistors R44–R47 and U40 form an amplifier with a gain of 60. C43 provides low-pass filtration for the DC amplifier. In the illustrated embodiment, the low-pass filer is set at 1.3 hertz. In the illustrated embodiment, this low-pass filtration is adequate because slave adaptive controller 516 samples the IMEAS signal at less than one hertz.

Based upon the IMEAS signal, slave adaptive controller 516 outputs control signals to adjust the ISET signal to set the current from programmable current source 506. Slave adaptive controller 516 sets the ISET signal via control signals to electronic potentiometer U41. U41 is similar to a digital-to-analog converter but is easier to use over different voltage ranges because U41 can be floated (i.e., the negative side may be coupled to a voltage other than ground). Floating U41 allows the system to be scaleable for different current ranges. For example, U41 may operate over different current ranges bases upon the country in which the modem operates. In other words, different countries have difference current ranges which can be drawn from the telephone line. Accordingly, it may be desirable to adjust the range over which the programmable current source and the ISET signal operate. In the illustrated embodiment, R43 sets the lower limit of ISET (the output of U41) and R41 and R42 set the upper limit of ISET. The control signals received from slave adaptive controller 516 adjust the voltage of the ISET signal between the upper and lower limits. In one embodiment, the voltage of ISET varies between 0.6040V and 1.5704V. These voltages correspond to a current range of 20 mA to 84 mA for programmable current source 506.

A current source resistance compensation network consisting of R40 and C40 compensates for changes in the effective input resistance of current source 506. The current source resistance compensation network is a feedback circuit that maintains a substantially constant effective input resistance of current source 506. As the voltage level of the RAWDC output of current source 506 increases, the effective input resistance of current source 506 increases. As the voltage level of RAWDC increases, the compensation network increases the voltage level of ISET. Increasing the voltage level of ISET increases the current level of current source 506, which decreases the effective input resistance of current source 506. Accordingly, a substantially constant effective input resistance of current source 506 is maintained. Capacitor C40 provides a low-pass filter to prevent oscillations in the compensation network feedback loop. Capacitors C41 and C42 are by-pass capacitors to minimize fluctuations on the signal lines.

Transistor Q40 is configured as an inverter and inverts the DACSEL input to provide the SATSEL output. The DACSEL input indicates whether the values encoded on the DACUP and DACADJ control lines from slave adaptive controller 516 are intended to adjust current servo 508 or saturation control unit 510.

Figure 11:
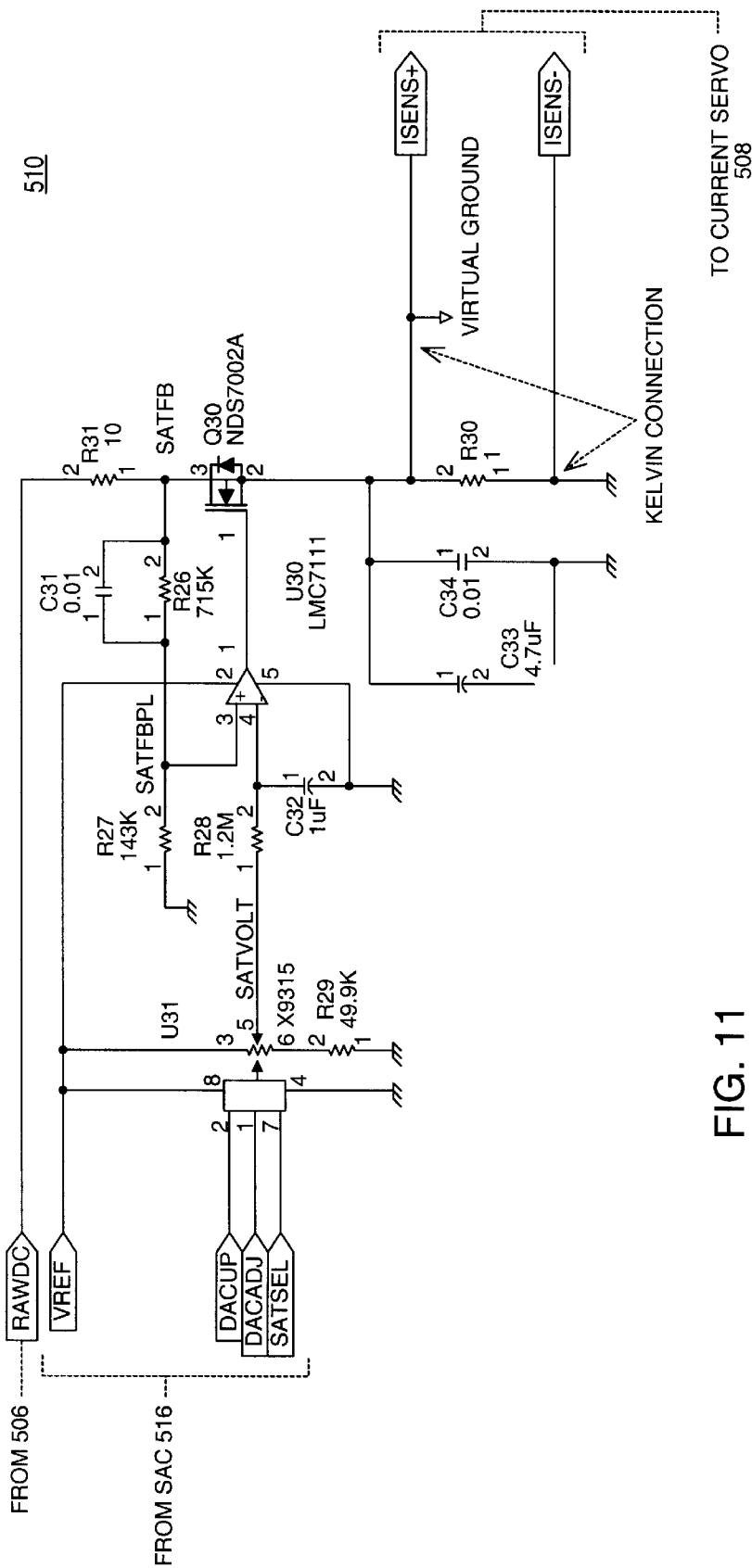
FIG. 11 is a schematic diagram of a saturation control circuit according to one embodiment of the present invention.

Turning now to FIG. 11, a schematic diagram of saturation control unit 510 is shown according to one embodiment of the present invention. Saturation control unit 510 clamps RAWDC to a programmable voltage level. Saturation control circuit 510 includes resistors R27–R31, capacitors C31–C35, MOSFET Q30 and electronic potentiometer U31. In one embodiment, the programmable voltage level is set to a voltage level slightly below the LOOPV+ voltage level. In this manner, saturation control unit 510 prevents the output transistors of programmable current source 506 (Q20 and Q22) from saturating when a light load occurs on the RAWDC signal.

Opamp U30, resistors R26 and R27 and capacitor C31 comprise an amplifier that controls the voltage at the source of Q30. In the illustrated embodiment, the amplifier has a gain of five and the voltage at the source of Q30 is clamped to a voltage five times the output voltage of U31. Capacitor C31 provides low-pass filtration on the feed-back loop. Resistor R28 and C32 controls the slew rate of the output of U32 such that the slew rate of RAWDC is less than one second.

Electronic potentiometer U31 is controlled by control signals from slave adaptive controller 516. As discussed above, in one embodiment, slave adaptive controller 516 determines the voltage at LOOPV+ and programs U31 such that RAWDC is clamped at a level slightly below the voltage at LINEV+. In one particular embodiment, slave adaptive controller 516 sets the clamp voltage of saturation control unit 510 such that the RAWDC signal is clamped at one volt below the voltage measured at LOOPV+.

Resistor R29 sets the lower limit of the output of U31. In one particular embodiment, the VREF signal is maintained at 4.1 VDC. In one particular embodiment, the tolerance of this level is about 1% or about 41 mVDC. This accuracy sets the overall accuracy of current servo 508 and saturation control unit 510 to greater than 99%.

C33 and C34 are filters to prevent voltage spikes when RAWDC is loaded. Resistor R31 is a dampening resistor that prevents saturation control unit 510 from oscillating.

The current sense used in current servo 508 is detected by sensing the voltage drop across resistor R30. Resistor R30 is a low impedance resistor used for the purpose of sensing current. In the illustrated embodiment, resistor R30 is a one ohm resistor. One terminal of resistor R30 is connected to line ground. The other terminal is connected to a virtual ground. The virtual ground is provided to voltage regulator 512 and modem-side push-pull switch 514 and provides a current return loop for the current used by those devices. By sensing the current drop across resistor R30, the current used by voltage regulator 512 and modem-side push/pull switch 514 can be detected. As discussed above, current servo 508 and slave adaptive controller 516 uses the current detected across R30 to control the current level of programmable current source 506.

Figure 12:
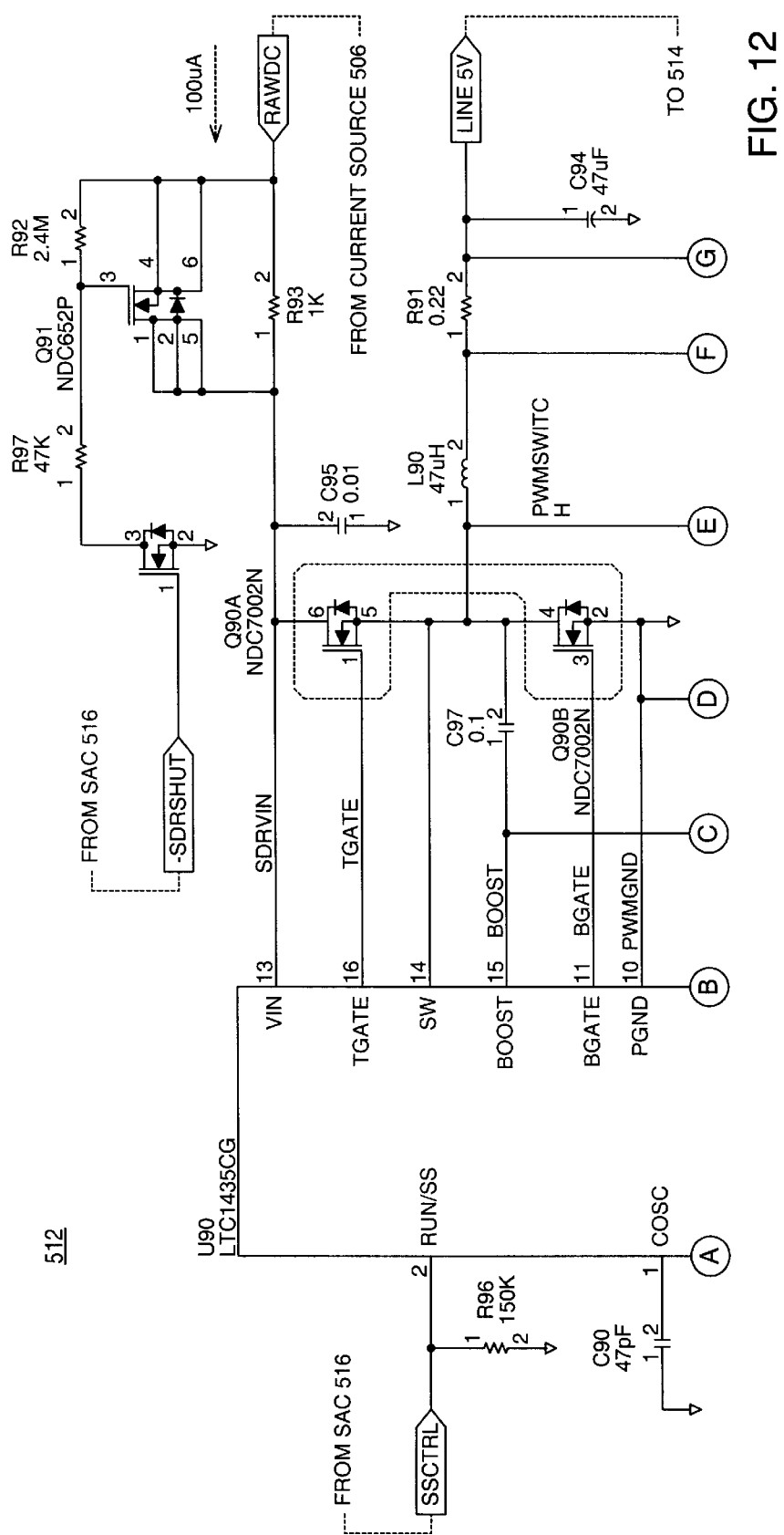
FIG. 12 is a schematic diagram of a voltage regulator according to one embodiment of the present invention.
Figure 12:
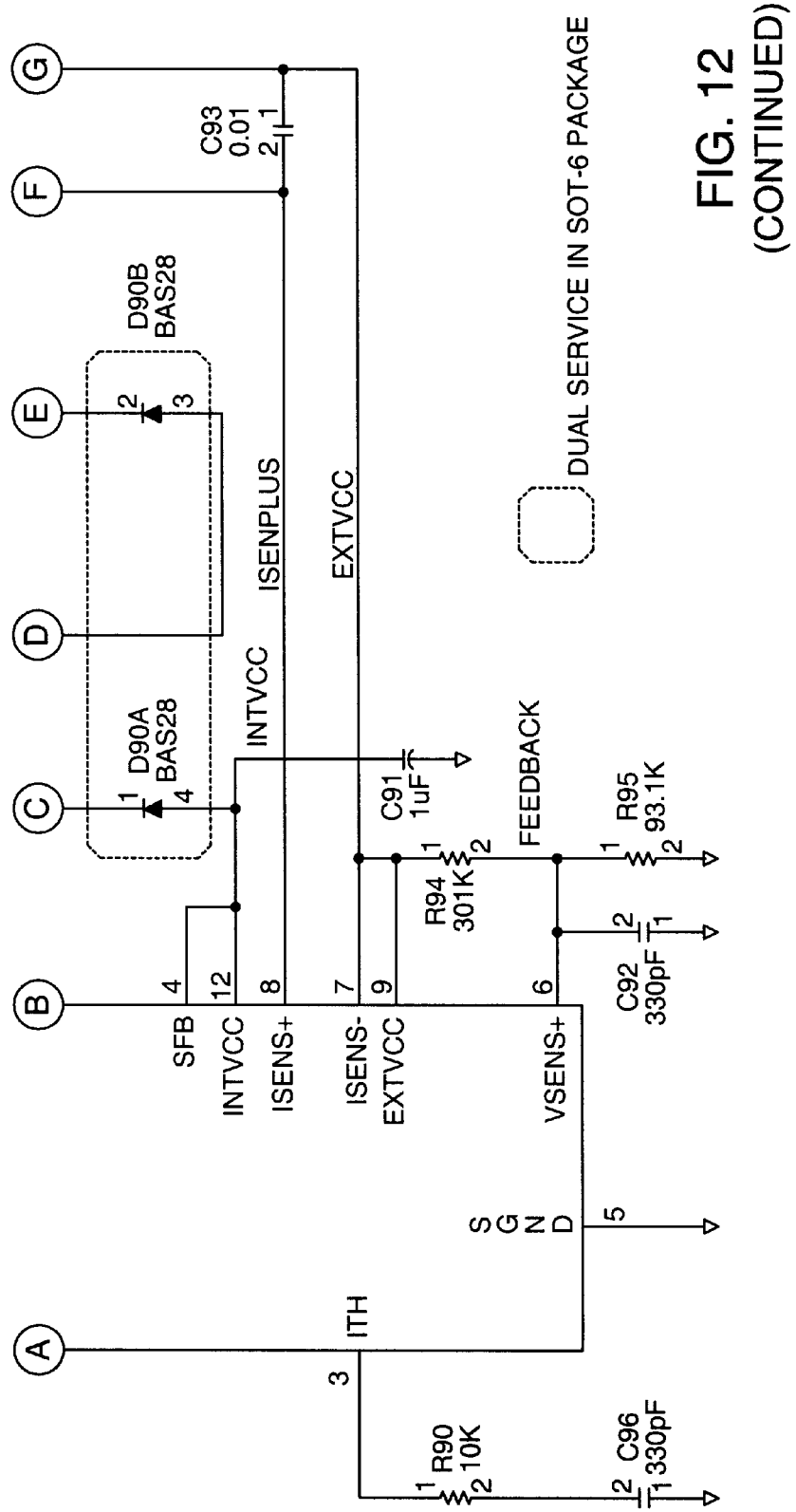

Turing now to FIG. 12, a schematic diagram of voltage regulator 512 is shown according to one embodiment of the present invention. Voltage regulator 512 receives the unregulated RAWDC from programmable current source 506 and outputs a regulated 5.0 volt signal (LINE5V). The regulated 5.0 volt signal is provided to line-side push-pull switch, which chops the 5.0 volt signal and inputs the resulting signal to transformer 306.

Voltage regulator 512 includes synchronous converter U90, MOSFETs Q90–Q92, resistors R90–R96, capacitors C90–C97, diode D90, and inductor L90. Synchronous converter U90 is a synchronous buck converter. Generally speaking, U90 alternately couples RAWDC or virtual ground to an input of a filter comprising L90, R91 and C94. The duty cycle, or pulse width, at which RAWDC is coupled to the input of the filter determines the voltage level at LINE5V. U90 senses the output voltage level at the VSENS pin and adjusts the pulse width at the TGATE and BGATE pins to regulate the output voltage.

U90 receives RAWDC at pin VIN. Q90A is coupled between VIN and inductor L90. Q90A is controlled by a TGATE output of U90. When TGATE is asserted, Q90A enters a low impedance state and couples RAWDC to inductor L90. Inductor L90 is additionally coupled to Q90B. Q90B is coupled between inductor L90 and virtual ground. Q90B is controlled by the BGATE output of U90. When the BGATE output is asserted, U90B couples inductor L90 to virtual ground. Typically, only Q90A or Q90B is in a low impedance state at one time. The pulse width, or percentage of time the Q90A is asserted versus Q90B, sets the output voltage at LINE5V.

As noted above, inductor L90, resistor R91 and capacitor C94 comprise a low-pass filter that stores the energy received from the RAWDC input and outputs a regulated 5.0 volt signal on LINE5V. U90 senses the output voltage at the VSENS input and adjusts the pulse width or duty cycle of the TGATE and BGATE outputs to regulate the output voltage.

In the illustrated embodiment, it is necessary to boost the gate voltage of Q90A to keep Q90A in a low impedance state after Q90A is turned on. Because RAWDC is typically greater than 8.0 volts, the TGATE output must provide a signal greater than 8.0 volts because the source of Q90A is pulled up to RAWDC when Q90A is in a low impedance state. The gate voltage of Q90A is provided by the BOOST input pin. When Q90B is in an on-state, one terminal of capacitor C97 is coupled to virtual ground via Q90B. The other terminal of capacitor C97 is coupled the INTVCC pin of U90. The INTVCC pin outputs a signal of approximately 5.0 volts which charges capacitor C97. When Q90B enters an off-state, the terminal of capacitor C97, which was previously grounded, is coupled to RAWDC. The other terminal of capacitor C97 will be approximately 5.0 volts higher than RAWDC. This voltage is input to the BOOST pin and provided to the TGATE output of U90.

The efficiency of voltage regulator 512 is enhanced by providing power to U90 from the regulated voltage output after the regulator is operating. This boot strap voltage is provided to the EXTVCC input and increases the efficiency of U90. Resistors R94 and R95 are part of the feedback voltage sense circuit and selected to provide an output at LINE5V of 5.0 volts.

Resistor R96 holds the RUN/SS input low during a cold restart sequence. When the RUN/SS input is low, U90 is non-operational and dissipates no power. When the RUN/SS input is high, U90 is active and provides a regulated 5.0 volt output.

Capacitor C90 sets the operating frequency of U90 at approximately 200 KHz. Resistor R90 and capacitor C96 provide network compensation for U90.

Q91, Q92, C95 and R93 are part of a soft start-up network for U90. When U90 begins operating, it may draw a large current input which programmable current source 506 may not be capable of providing. Accordingly, a soft start-up network is provided. Prior to start-up, the RUN/SS and the SDRSHUT inputs are deactivated. Accordingly, U90 is inactive, Q91 is in an off-state and RAWDC charges capacitor C95 through resistor R93. Prior to an off-hook condition, the RUN/SS input is asserted and U90 begins switching. Because Q91 is off, R93 limits the current input to U90. After a predetermined time, Q92 is turned on by asserting the SDRSHUT input. Q92 turns Q91 on and shorts resistor R93 to provide full current to VIN. In one embodiment the SDRSHUT input is asserted 100 msec after the RUNS/SS input is asserted.

Figure 13:
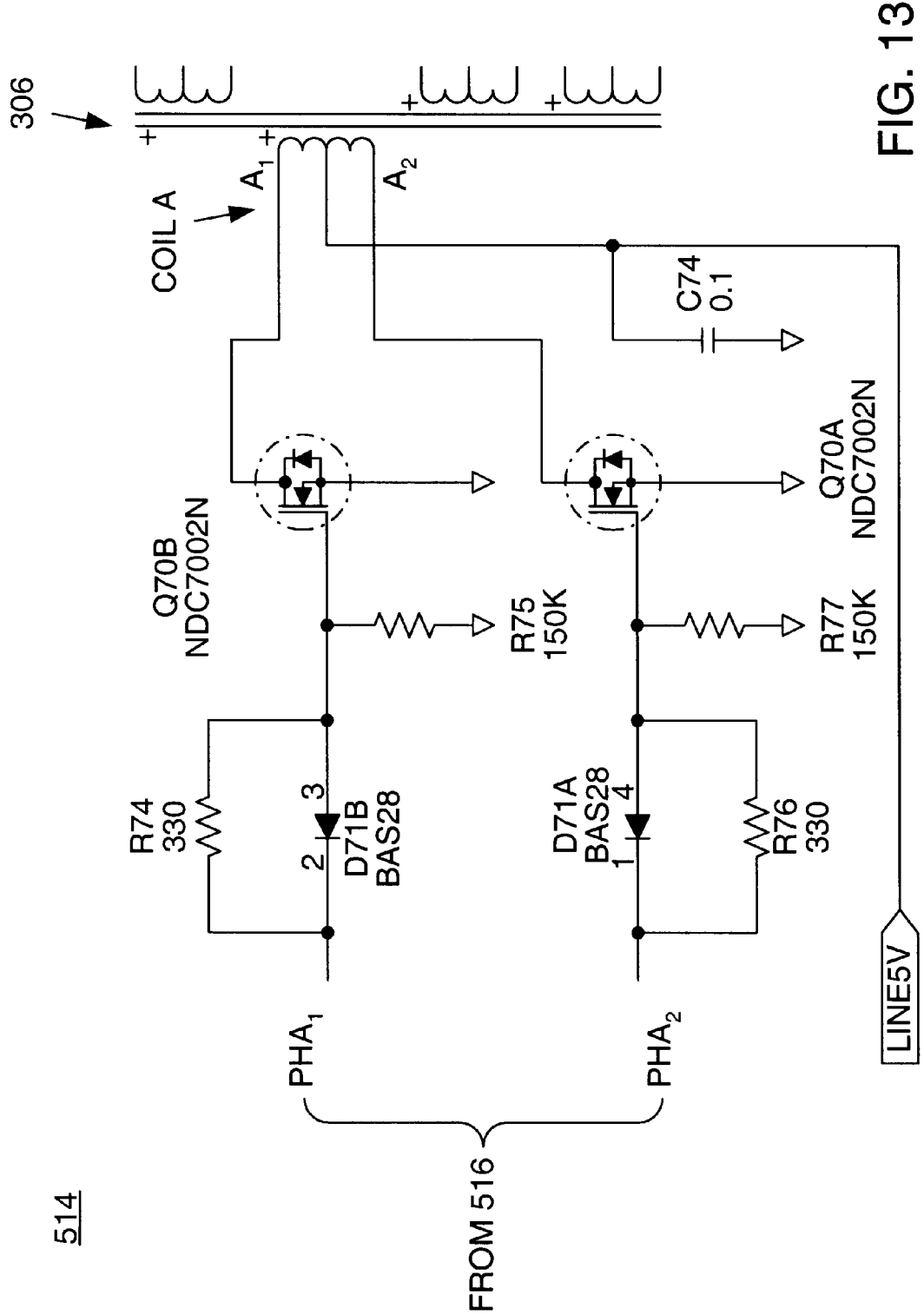
FIG. 13 is a schematic diagram of a line-side push-pull switch according to one embodiment of the present invention.

Turning now to FIG. 13, a schematic diagram of line-side push-pull switch 514 according to one embodiment of the present invention is shown. Line-side push-pull switch 514 chops the regulated 5.0 volt signal (LINE5V) received from voltage regulator 512 to provide energy to transformer 306. Line-side push-pull switch 514 includes MOSFET Q70, resistors R74–R77, diode D71 and capacitor C74.

LINE5V is provided to a center-tap of coil A of transformer 306. The terminals of coil A are coupled to Q70A and Q70B. Q70A and Q70B are alternately gated such that one terminal of coil A is coupled to ground. By alternately gating Q70A and Q70B, LINE5V is chopped and an AC signal is induce into transformer 306. The signal provided to transformer 306 is substantially a 5.0 volt square wave.

Q70A and Q70B are gated by the $PHA_1$ and $PHA_2$ control signals received from slave adaptive controller 516. The control signals are typically square waves that are 180 degrees out-of-phase. Each half cycle, one device is on and the other device is off. In the alternating half cycle, the control signals turn on the device that was previously off and turn off the device that was previously on. In one embodiment, $PHA_1$ and $PHA_2$ are 200 KHz square waves with a 50% duty cycle. The high frequency switching results in a small transformer size.

Diode D71A and resistor R76 form a network that turns off Q71A more quickly than it turns on. Likewise, resistor R74 and diode D71B form a network that turns off Q70B more quickly than it turns on. These networks insure that one device is substantially off before the other device turns on. If both devices are partially on for a period of time, power loss is increased. Resistors R75 and R77 keep Q70A and Q70B off during cold restarts.

In the illustrated embodiment, Q70A and Q70B are part of a dual N-MOS package. The devices have a low on-resistance (two ohms or less) and they are balanced in switching losses and gate capacitance. Accordingly, flux imbalance is very low and no DC component is introduced to transformer 306, which reduces core loss. Capacitor C74 is a bypass capacitor to eliminate noise on the LINE5V signal line.

In a preferred embodiment, transformer 306 is a multi-winding transformer on a toroid core with 1500 VAC isolation between its primary and secondary. In one embodiment, transformer 306 implements bi-filar winding on the toroidal transformer, which reduces flux imbalance, prevents DC saturation of the core, and eliminates the need for snubbing.

As discussed above, in an alternative embodiment, energy is extracted from transformer 306 by modem-side push-pull switch 514 rather than induced into transformer 306. In this embodiment, voltage regulator 512 is inactive and line-side push-pull switch 514 acts as a rectifier. Q70A and Q70B are in an off-state. The substrate diodes of Q70A and Q70B rectify an AC voltage from transformer 306 and output of a DC signal on LINE5V. Each substrate diode rectifies the voltage during one half cycle and the voltage at the center-tap of the transformer coil is positive with respect to ground.

Figure 14:
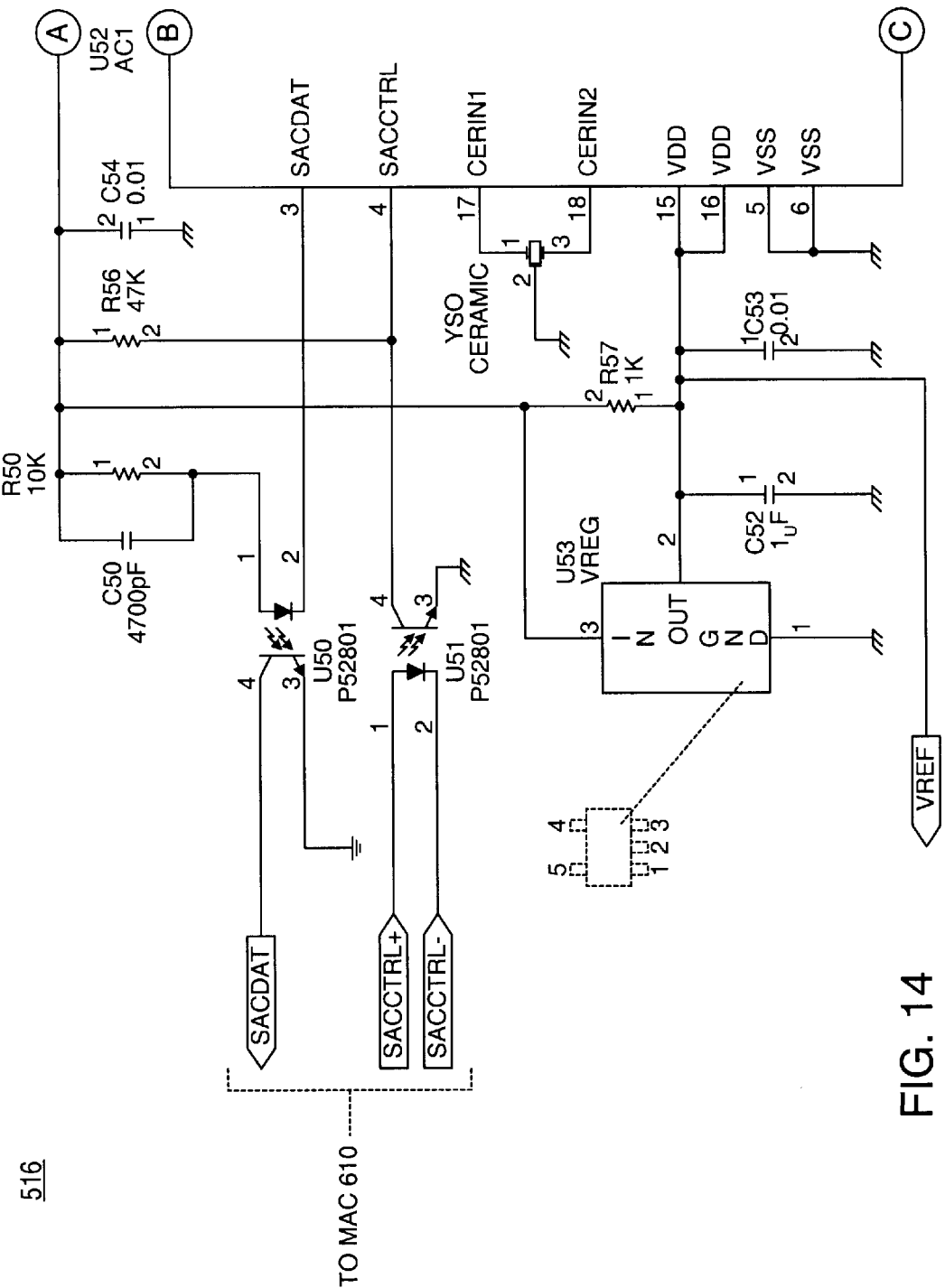
FIG. 14 is a schematic diagram of a slave adaptive controller according to one embodiment of the present invention.
Figure 14:
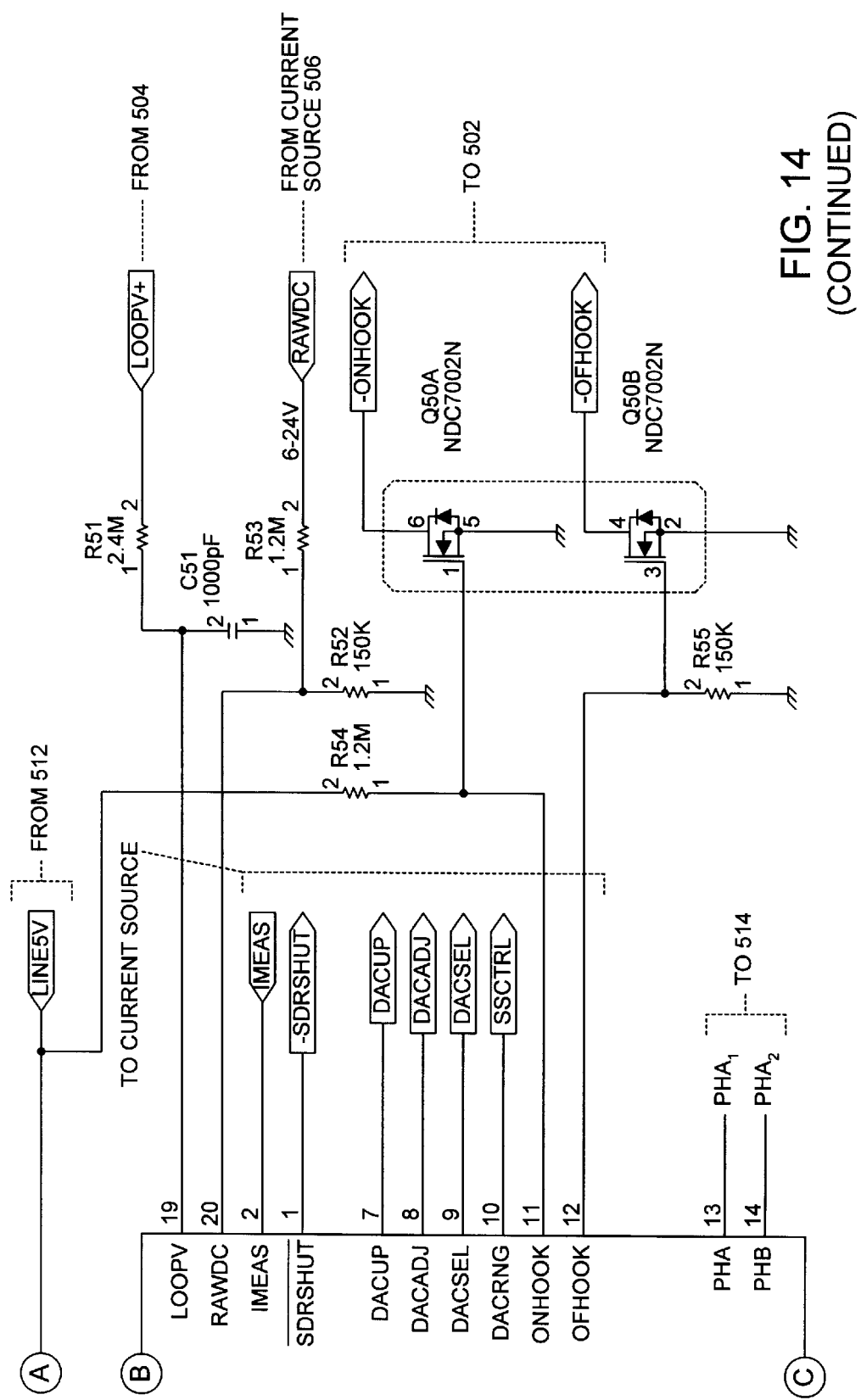

Turning now to FIG. 14, a schematic diagram of slave adaptive controller 506 according to one embodiment of the present invention is shown. Slave adaptive controller may be any conventional controlling device. In the illustrated embodiment, slave adaptive controller 506 is a microcontroller manufactured by MicroChip, Inc. In the illustrated embodiment, slave adaptive controller 506 operates at a 1 MHz clock rate. Slave adaptive controller 506 controls most of the functions of APS 120. In a preferred embodiment, slave adaptive controller 506 is a low power consumption device. Slave adaptive controller 506 is powered from the LINE5V power signal. In one embodiment, prior to an off-hook condition, APS 120 is configured to provide power to LINE5V from battery 114. In one particular embodiment, the power is extracted from transformer 306 via line-side push-pull switch 514. After an off-hook condition, master adaptive controller 610 begins a cold restart sequence which causes voltage regulator 512 to supply voltage to LINE5V.

Slave adaptive controller 506 communicates to master adaptive controller 610 via opticouplers U50 and U5 1. Opticoupler U50 is configured to transmit data to master adaptive controller 610. Opticoupler U51 is configured to receive data from master adaptive controller 610. In a preferred embodiment, serial data is transmitted and received by opticouplers U50 and U51 at a data rate of approximately 2 KHz. Data going to the master adaptive controller includes calibration parameters and the power ratio.

In the illustrated embodiment, a 4 MHz ceramic oscillator (Y50) provides adequate frequency stability for slave adaptive controller 516 to switch power at 200 KHz and to communicate with master adaptive controller 610. Voltage regulator U53 outputs a stable 4.1 VDC reference signal (VREF) used for most line-side components. The VREF output is also used by slave adaptive controller 516 for internal circuitry.

Slave adaptive controller 516 is configured to measure several parameters. Slave adaptive controller 516 determines the voltage of LOOPV+ by measuring the charge time constant of capacitor C51 through resistor R51. Slave adaptive controller 516 measures the RAWDC voltage using an analog-to-digital converter within the controller. In this manner, the RAWDC voltage may be measured faster but with less precision than the LOOPV+ voltage. Slave adaptive controller 516 is additionally configured to measure the voltage at the IMEAS input signal using an internal analog-to-digital converter.

Slave adaptive controller 516 provides output control signals to circuitry within APS 120. The SDRSHUT signal is activated by slave adaptive controller 516 a predetermined time after a cold restart. As discussed above, the SDRSHUT signal controls the soft startup network of step-down regulator 512. The DACUP, DACADJ and DACSEL signals are used to program the electronic potentiometers of current servo 508 and saturation control 510. In the illustrated embodiment, the DACADJ signal identifies the amount to increase or decrease the current setting of the electronic potentiometer. The DACUP signal indicates whether to increase or decrease the setting of electronic potentiometer by the amount specified by the DACADJ signal. The DACSEL signal is used to select either the electronic potentiometer of current server 508 or saturation control 510. The SSCTRL signal is coupled to the RUN/SS input of voltage regulator 512, which enables and disables voltage regulator 512.

Q50A, Q50B, and resistors R54 and R55 provide ONHOOK and OFHOOK signals to control latching relay RL1 of hook switch 502. When slave adaptive controller 516 is disabled, an ONHOOK signal is conveyed to the latching relay due to the voltage on R54. Because the ONHOOK and OFHOOK control signals are referenced to line ground, the solid state relay has lower isolation requirements between its coil and contacts.

Two phase signals ($PHA_1$ and $PHA_2$) are output to line-side push-pull switch 514. The two phase signals are approximately 200 KHz square-wave signals and are 180 degrees out-of-phase. The phase signals are enabled during the period of a power cycle in which telephone line 114 is providing power to APS 120. The phase signals are disabled during the period of a power cycle in which power is supplied from bus voltage 116.

Figure 15:
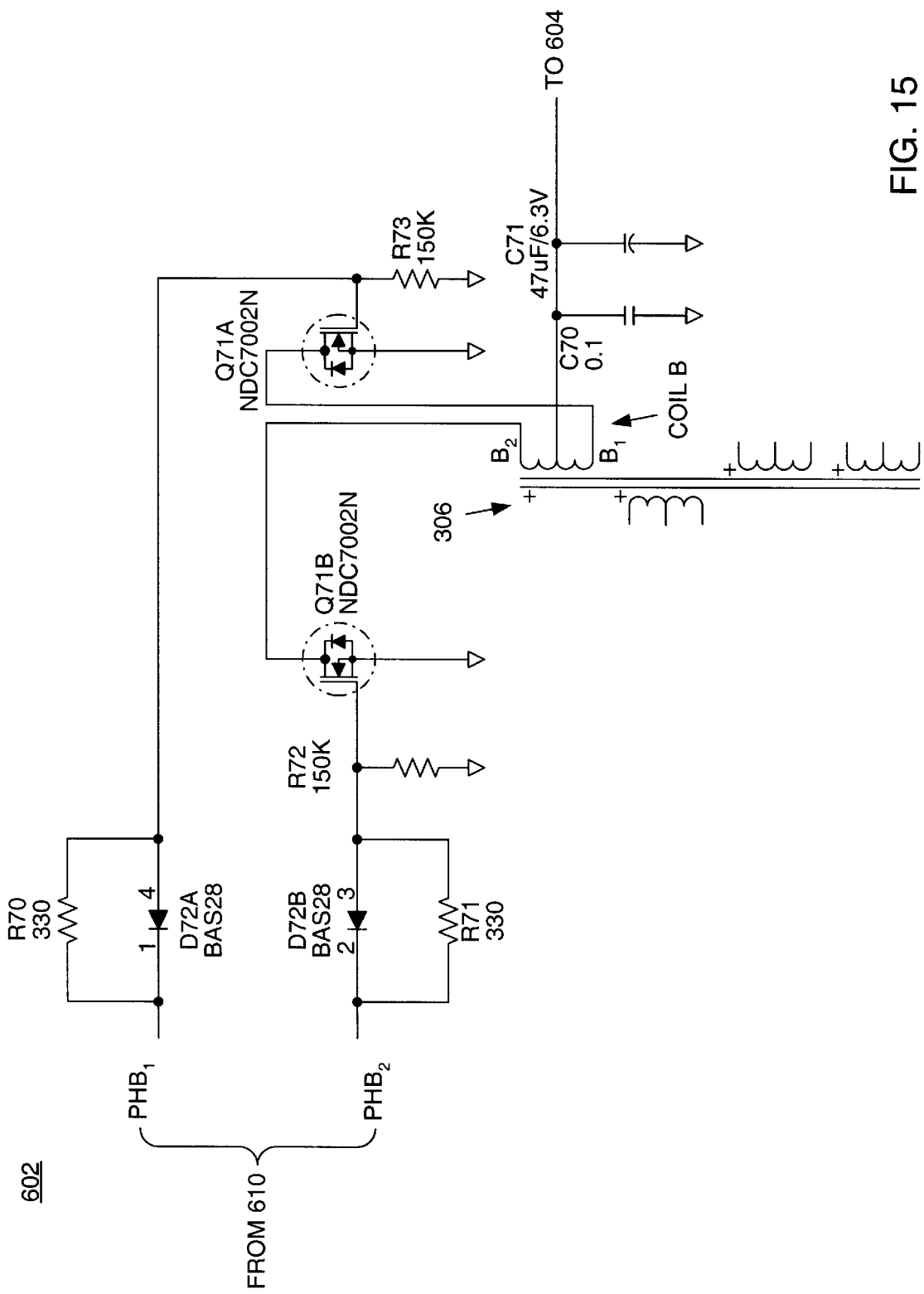
FIG. 15 is a schematic diagram of a modem-side push-pull switch according to one embodiment of the present invention.

Turning now to FIG. 15, a schematic diagram of modem-side push-pull switch 602 is shown according to one embodiment of the present invention. Modem-side push-pull switch 602 operates in substantially the same manner as line-side push-pull switch 514. Modem-side push-pull switch is designed to either induce energy into transformer 306 or extract energy from transformer 306. In one embodiment, a bus voltage signal 116 (BUSVOLT) is coupled to the center-tap of coil B of transformer 306. Q71A and Q71B switch at 200 KHz under the control of phase signals $PHB_1$ and $PHB_2$ of master adaptive controller 610. As discussed in more detail below, master adaptive controller 610 alternately enables Q71A and Q71B during the portion of the power cycle in which power is supplied from bus voltage 116 to transformer 306.

In an alternative embodiment, bus voltage 116 is at 3.3 volts and modem-side push-pull switch 602 supplies power to 5.0 volt output 310. In this embodiment, Q71A and Q71B rectify the output signal from transformer 306 using the substrate diodes of the devices. Although the use of the substrate diodes to rectify the output of transformer 306 is less efficient than a synchronous rectifier, such as synchronous rectifier 608, the current output by modem-side push-pull switch 602 is typically minimal and accordingly the losses do not significantly effect the efficiency of APS 120. In a similar manner to that discussed above with reference to FIG. 13, resistors R70 and R71 and diodes 72A and 72B control the turn-off and turn-on time of Q71A and Q71B. Additionally, R72 and R73 hold Q71A and Q71B in an off-state during a cold restart sequence. Capacitors C70 and C71 store energy and filter 5.0 volt output 310 when Q71A and Q71B rectifies the signal from transformer 306.

Figure 16:
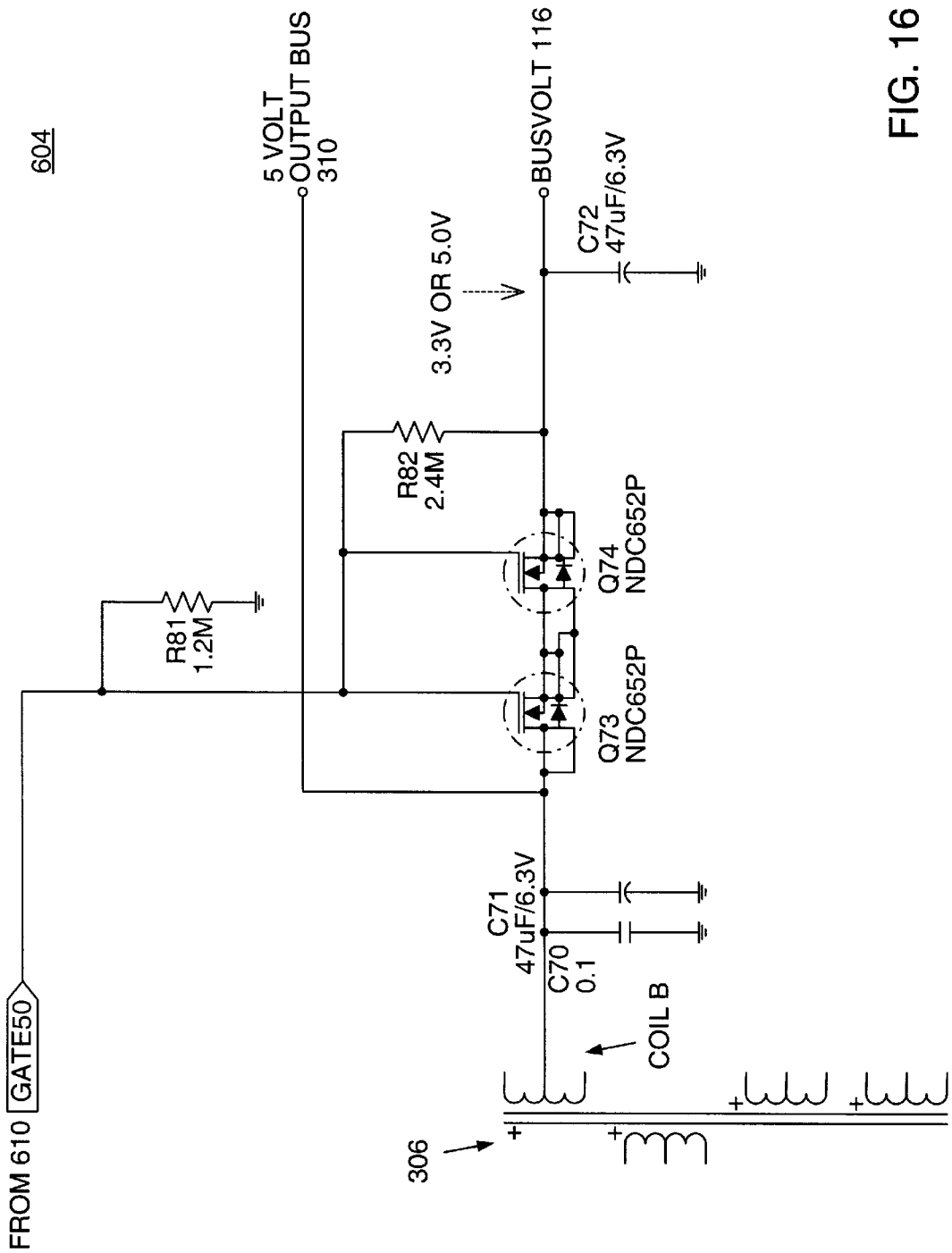
FIG. 16 is a schematic diagram of a reverse flow protector according to one embodiment of the present invention.

Turning now to FIG. 16, a schematic diagram of reverse flow protector 604 according to one embodiment of the present invention is shown. Reverse flow protector 604 includes FETS Q73 and Q74, resistor R81, and capacitors C70–C72. Generally speaking, reverse flow protector 604 isolates bus voltage 116 from 5.0 volt output 310 when bus voltage 116 is at 3.3 volts. As discussed above, coil B of transformer 306 is bi-directional. When bus voltage 116 is at 3.3 volts, the power to 5.0 volt output bus 310 may be supplied from coil B of transformer 306. In this embodiment, FETS Q73 and Q74 are in an off-state and isolate bus voltage 116 from 5.0 volt output bus 310. Alternatively, when bus voltage 116 is at 5.0 volts, voltage may be supplied from bus voltage 116 to transformer 306 and 5.0 volt output bus 310. In this embodiment, Q73 and Q74 are in an on-state and bus voltage 116 is coupled to the center-tap of coil B of transformer 306 and 5.0 volt output bus 310.

When bus voltage 116 is at 5.0 volts, GATE 50 is de-asserted and Q73 and Q74 are in an on-state. The bus voltage 116 is coupled to the center-tap of coil B of transformer 306 and provides DC power for Q71A and Q71B of modem-side push-pull switch 602.

When bus voltage 116 is at 3.3 volts, GATE 50 is asserted and Q73 and Q74 are in an off-state. Two MOSFETs are connected in a series to obtain two diode drops from 5.0 volt output 310 to bus voltage 116. The diode drops of the substrate diodes of Q73 and Q74 are approximately 2 volts. This insures that no current flows from bus voltage 116 to 5.0 volt output bus 310 when Q73 and Q74 are in an off-state. R81 is a pull-down resistor for Q73 and Q74 such that the FETs are in a low-impedance state during a cold restart sequence.

Figure 17:
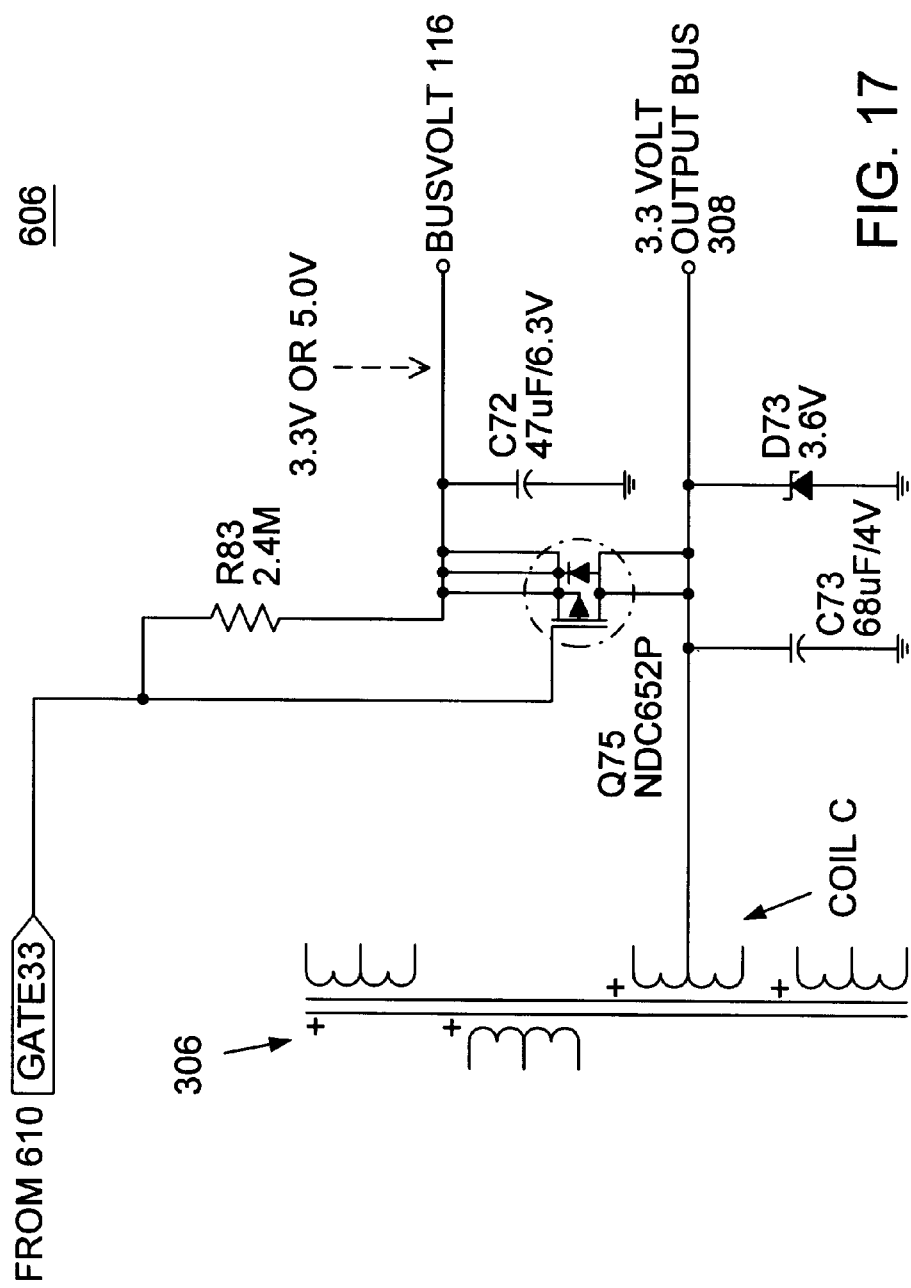
FIG. 17 is a schematic diagram of a power time division multiplex switch according to one embodiment of the present invention.

Turning now to FIG. 17, a schematic diagram of power time division multiplex switch (PTDMS) 606 according to one embodiment of the present invention is shown. Generally speaking, PTDMS 606 couples bus voltage 116 to 3.3 volt output bus 308 based upon the power ratio determined by slave adapative controller 516. PTDMS 606 includes FET Q75, resistor R83, capacitors C72 and C73, and zener diode D73.

If bus voltage 116 is at 3.3. volts, Q75 is gated on and off according to the power ratio determined by slave adaptive controller 516. This gating is done under the control of the GATE 33 signal and connects bus voltage 116 directly to 3.3. volt output bus 308. Bus voltage 116 is connected directly to 3.3 volt output 308 during a portion of a power cycle. During the remaining portion of the power cycle, power is output to 3.3. volt output 308 by synchronous rectifier 608. When the power from telephone line 114 is sufficient to provide power to modem 109, Q75 is in the off-state the majority of time and the power derived from bus voltage 116 is minimal.

If bus voltage 116 is at 5.0 volts, Q75 remains in an off-state and all power on 3.3 volt output bus 308 is extracted from transformer 306.

Capacitor C73 filters any AC switching noise on 3.3 volt output bus 308. Zener diode D73 provides protection against voltage spikes that exceed 3.6 volts. C72 is a bypass capacitor to minimize fluxations of bus voltage 116.

Figure 18:
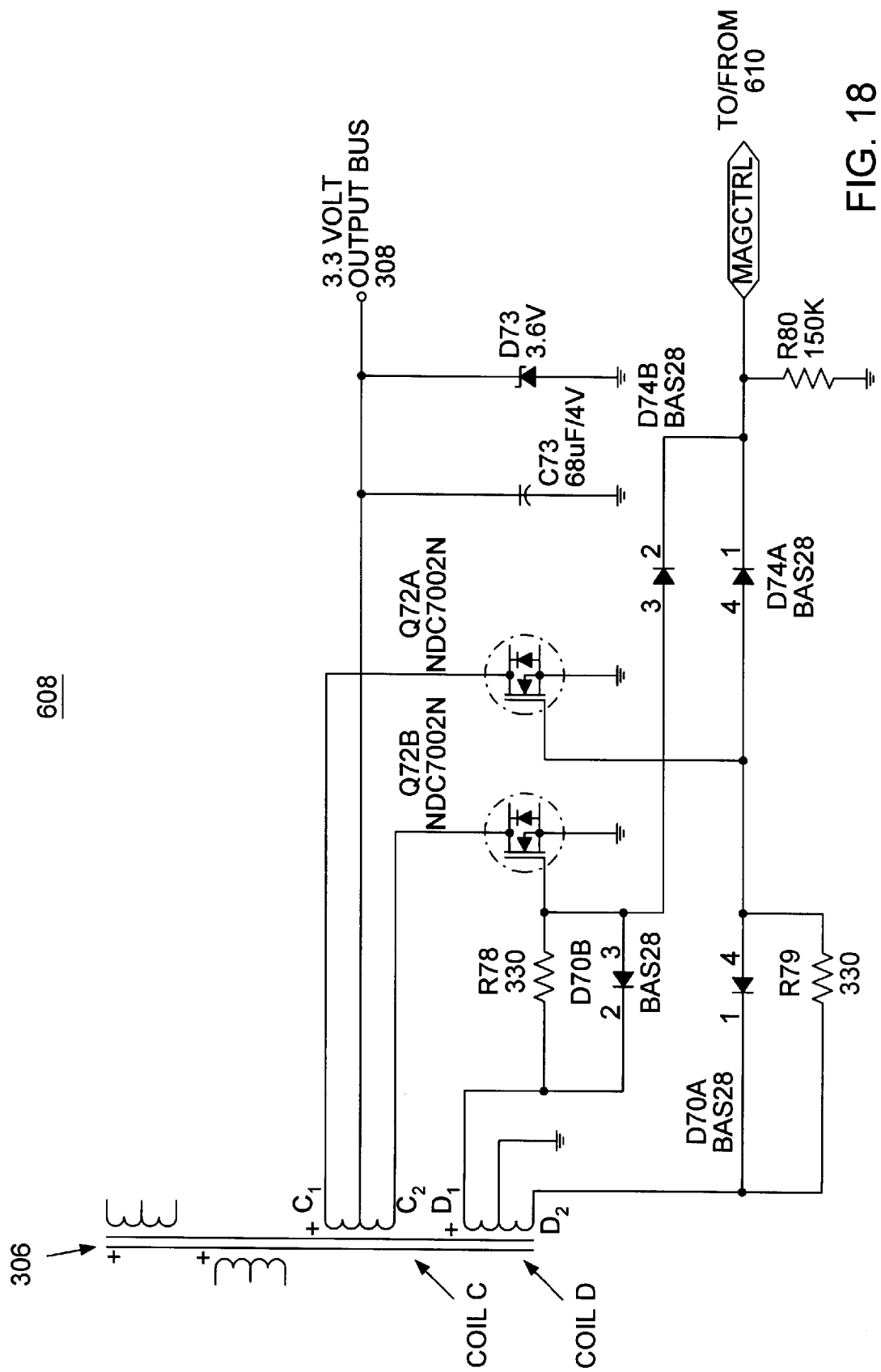
FIG. 18 is a schematic diagram of a synchronous rectifier according to one embodiment of the present invention.

Turning now to FIG. 18, a schematic diagram of synchronous rectifier 608 according to one embodiment of the present invention is shown. Synchronous rectifier 608 rectifies the output of transformer 306 and provides a 3.3 volt DC output signal on 3.3 volt output bus 308. In the illustrated embodiment, synchronous rectifier 608 includes FETS Q72A and Q72B, resistors R78–R80, diodes D70A, D70B, D74A, D74B and D73, and capacitor C73.

When the polarities of the top terminals of coils C and D are positive with respect to the bottom terminals of the coils, the gate of Q72B is positive with respect to its source, which is coupled to ground. Accordingly, Q72B is in an on-state and the lower terminal of coil C is coupled to ground. The output of 3.3 volt output bus 308 is positive with respect to ground and outputs a 3.3 volt signal. When the polarities of the coils change and the bottom terminal of the coil is positive with respect to the top terminal of the coil, Q72B is in an off-state and the gate of Q72A is positive with respect to the source. Accordingly, Q72A is in an on-state and the top terminal of coil C is coupled to ground. The 3.3 volt output bus 308 is positive with respect to ground and outputs 3.3 volts. Resistors R78 and R79 and diodes D70A and D70B control the turn-on and turnoff times of Q72A and Q72B. These circuits are similar to the gate circuits discussed above in reference to FIGS. 13 and 14. As discussed above, C73 and D73 filter 3.3 volt output bus 308 and clamp the voltage to 3.6 volts of less.

D74A and D74B are coupled to a magnetic control (MAGCTRL) output signal. MAGCTRL is used to detect when magnetic switching occurs in transformer 306. MAGCTRL is also used to stop the switching of synchronous rectifier 608 after line-side push-pull switch 514 stops switching. Due to the natural resonance of synchronous rectifier 608 and the magnetic core of transformer 306, Q72A and Q72B may continue to switch after line-side push-pull switch 514 has stopped. To prevent this condition, the MAGCTRL signal is grounded for a predetermined time period after line-side push-pull switch 514 stops. In a preferred embodiment, MAGCTRL is grounded 200 microseconds after line-side push-pull switch 514 stops switching. In one particular embodiment, the MAGCTRL signal is grounded for approximately two switching cycles and then released. R80 is a pull-down resistor that holds the MAGCRTL signal low during a cold restart sequence.

Figure 19:
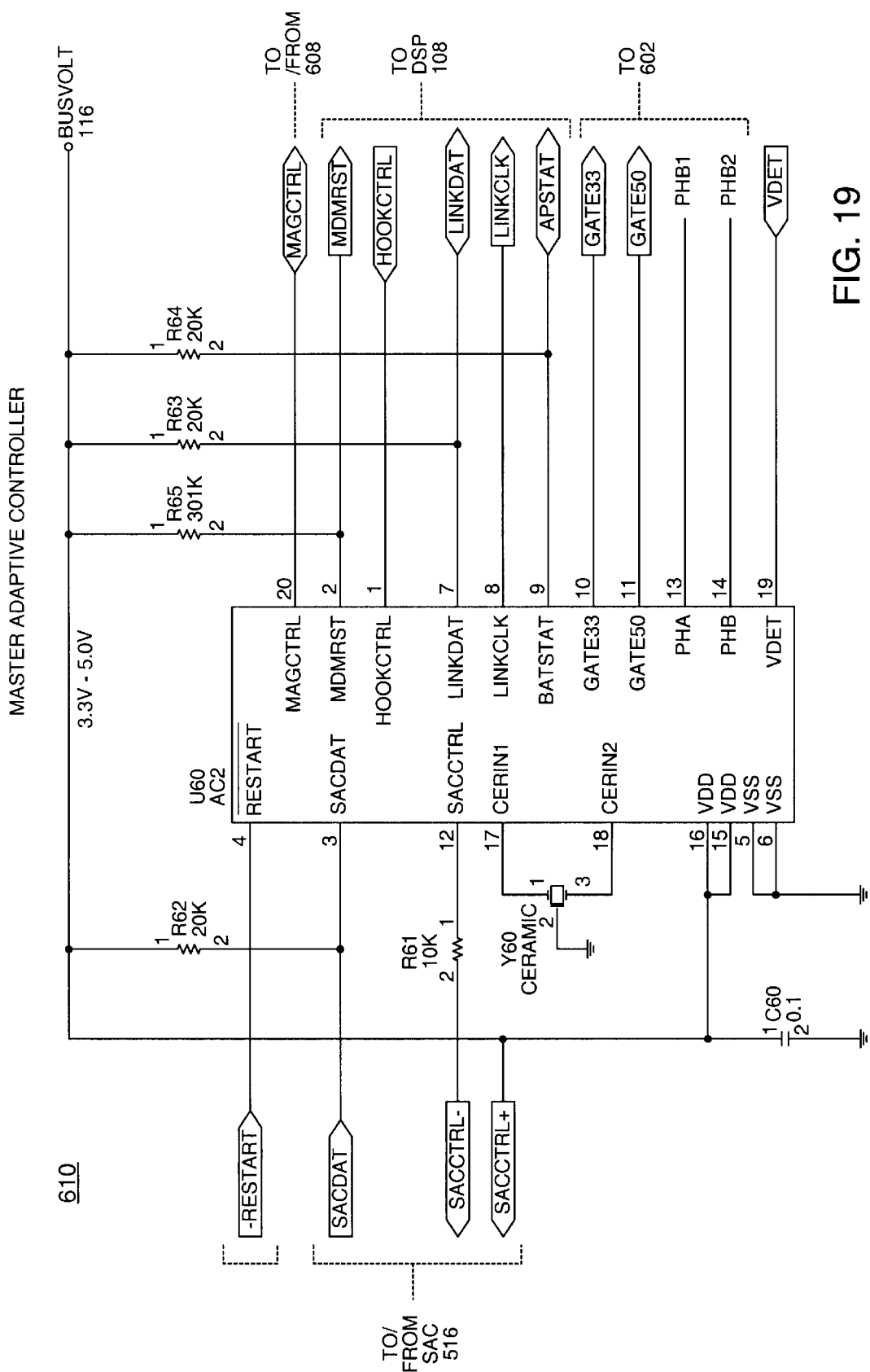
FIG. 19 is a schematic diagram of a master adaptive controller according to one embodiment of the present invention.

Turning now to FIG. 19, a schematic diagram of master adaptive controller 612 according to one embodiment of the present invention is shown. Like slave adaptive controller 516, master adapt controller may be any conventional control device. In the illustrated embodiment, master adaptive controller 610 is a microcontroller from MicroChip, Inc. Master adaptive controller 610 is powered from bus voltage 116. Master adaptive controller 610 receives a reset signal on the RESTART input and begins executing its microcode when the restart pin is asserted. After the reset, master adaptive controller 610 determines the voltage of bus voltage 116 by monitoring the pin VDET. Based upon the voltage level of bus voltage 116, master adapt controller 610 appropriately configures the modem-side devices. For example, master adaptive controller 610 may assert either the GATE 33 or GATE 50 signal depending upon the voltage level at bus voltage 116.

Master adaptive controller 610 communicates with slave adaptive controller 615 via the SACDAT and the SACCTRL control lines. As discussed above in reference to FIG. 14, slave adaptive controller 516 and master adaptive controller 610 are isolated by optocouplers.

A ceramic oscillator (Y60) provides adequate frequency stability for master adaptive controller 610. Master adaptive controller communicates to modem 109 through signals LINKDAT and LIKCLK. Master adaptive controller 610 additionally receives a HOOKCTRL signal from modem 109. Prior to an off-hook condition, master adaptive controller 610 receives calibration and other parameters from DSP108, such as configuration data identifying the parameters of the telephone systems of different countries. Master adaptive controller 610 may then start up APS 120 by switching modem-side push-pull switch 602 via the $PHB_1$ and $PHB_2$ signals. This begins a cold restart sequence of APS 120.

Figure 20:
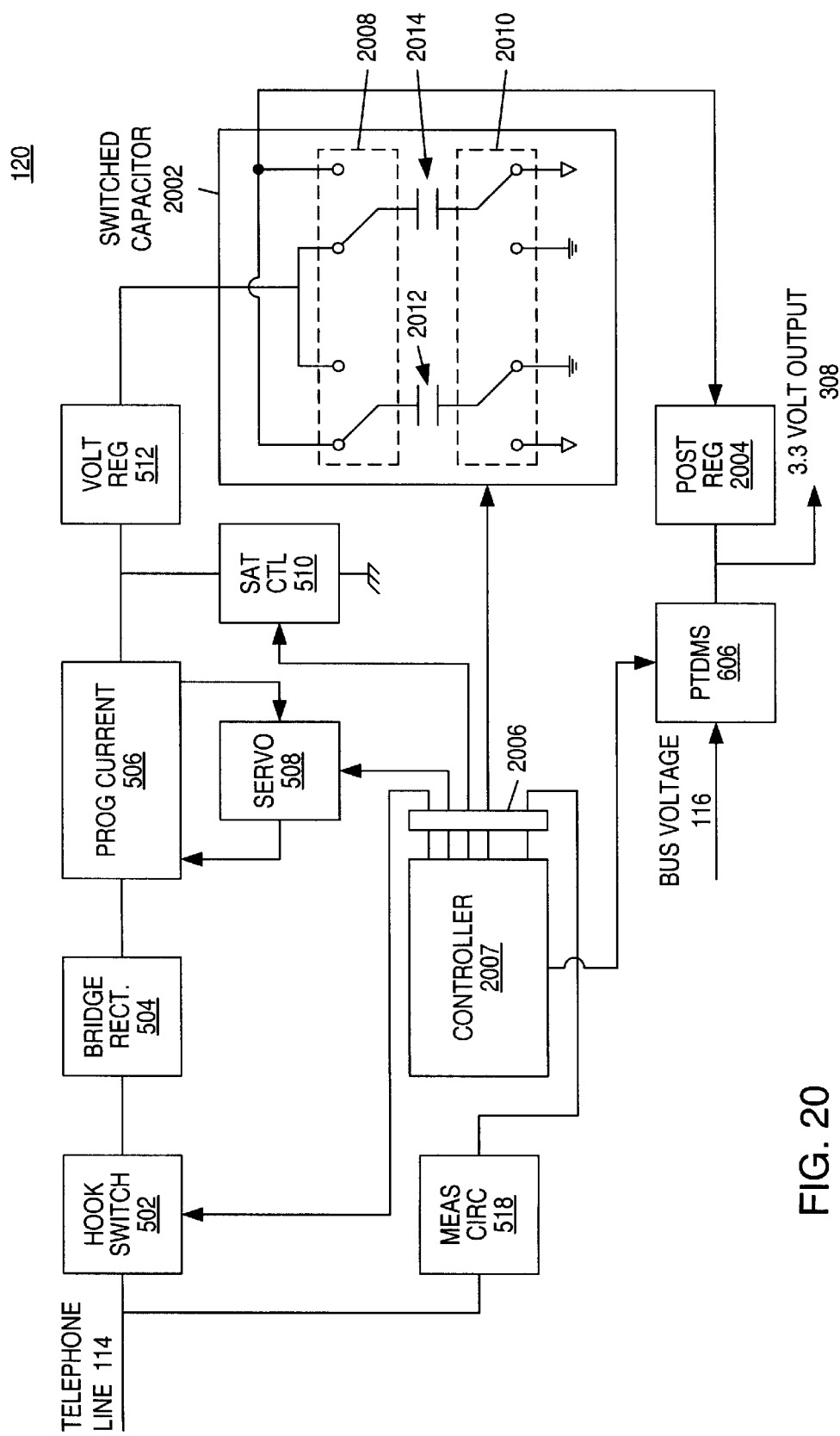
FIG. 20 is a schematic diagram of an adaptive power source implementing switched capacitors according to one embodiment of the present invention.

Turing now to FIG. 20, an alternative embodiment of APS 120 according to one embodiment of the present invention shown. In the alternative embodiment, a switched capacitor implementation of APS 120 is shown. Components that are similar or identical to the those discussed above are given the same reference numerals for simplicity. In the illustrated embodiment, APS 120 includes hook switch 502, bridge rectifier 504, programmable current source 506, current servo 508, saturation control 510, voltage regulator 512, switch capacitor circuit 2002, post regulator 2004, power time division multiplex switch 606, controller 2007, parameter measurement circuits 518, and isolation circuit 2006.

Hook switch 502 is coupled to telephone line 114. Hook switch 502 receives control signals from controller 2007 that indicates whether modem 109 is in an on-hook or off-hook condition. If modem 109 is on-hook, hook switch 502 is open and no current is provided to bridge rectifier 504. Alternatively, if modem 109 is off-hook, hook switch 502 is closed and the telephone signal on telephone line 114 is coupled to bridge rectifier 504 and modem 109. The audio portion of the telephone signal is provided to modem 109. The DC portion of the telephone signal is rectified by bridge rectifier 504. The output of bridge rectifier 504 is provided to programmable current source 506. Programmable current source 506 is programmed for a specific current determined by the maximum power available from the telephone line. Current servo 508 controls programmable current source 506 to insure a constant current output. Saturation control 510 clamps the voltage output of programmable current source 506 such that the transistors on the output of programmable current source 506 do not saturate. The output of programmable current source 506 is coupled to voltage regulator 512 which outputs a regulated output voltage to switch capacitor circuit 2002.

In one embodiment, switch capacitor circuit 2002 includes switches 2008 and 2010 and capacitors 2012 and 2014. At any one time, one capacitor is coupled to the output of voltage regulator 512 while the other capacitor is coupled to supply energy to post-regulator 2004. At predefined intervals, switches 2008 and 2010 change state such the capacitor that was previously connected to voltage regulator 512 is now coupled to post-regulator 2004 and the capacitor that previously coupled to post-regulator 2004 is now coupled to voltage regulator 512. Post-regulator 2002 outputs a regulated voltage to 3.3 volt output bus 308 and 5.5 volt output bus 310. Post-regulator 2004 is a conventional step-up/step-down converter. For example, in the one embodiment, post-regulator 204 may output a 3.3 volt signal with an input ranging from 1.2 volts to 5 volts.

PTDMS 606 supplements the power extracted from telephone line 114 with power from bus voltage 116. Controller 2007 is a conventional controller such as those described above in reference to slave adaptive controller 516 and master adaptive controller 610. Controller 2007 determines the maximum power available from telephone line 114 and sets programmable current source 506 to extract the maximum current from the telephone line. Controller 2007 additionally monitors the voltage output from hook switch 502 and sets saturation control 510 to clamp the voltage output of the current source slightly below the hook switch voltage. Controller 2007 additionally determines a power ratio of power available from the telephone system and the total power required for modem 109. Based upon the power ratio, controller 2007 controls the switching of switch capacitor circuit 2002 and PTDMS 606. Controller 2007 may use power time division multiplexing similar to the method described above in reference to FIG. 4. During the portion of the power cycle in which telephone line 114 is providing power, controller 2007 switches 2008 and 2010 at a predetermined rate. During the remaining portion of the power cycle, controller 2007 discontinues the switching of switch capacitor circuit 2002 and couples bus voltage 116 directly to 3.3 volt output bus 308. Because controller 2007 is powered from the output of switch capacitor 2002, an isolation circuit exists between controller 2007 and measurement circuit 518, hook switch 502, programmable current source 506, current servo 508, and saturation control circuit 510.

In one particular embodiment, switches 2008 and 2010 are latching mechanical relays. The latching mechanical relays include one or more coils to set or reset the relays. The amount of power consumed by the relay coil is minimal because a single pulse is sufficient to switch the relay. In other embodiments, any conventional mechanical or electrical switch may be implemented.

In one particular embodiment, the switching rate of switches 2008 and 2010 is relatively slow. For example, in one embodiment, the switching rate is one hertz. In this embodiment, the capacitors are relatively large to maintain sufficient voltage for post-regulator 2004 during 60 seconds of discharge. In this embodiment, the power consumed by switches 2008 and 2010 is minimal because the switches only consume power when transitioning from one state to the other and a state transition only occurs once every second. Additionally, in this embodiment the slow switching state prolongs the reliable operating life of switches 2008 and 2010.

Figure 21:
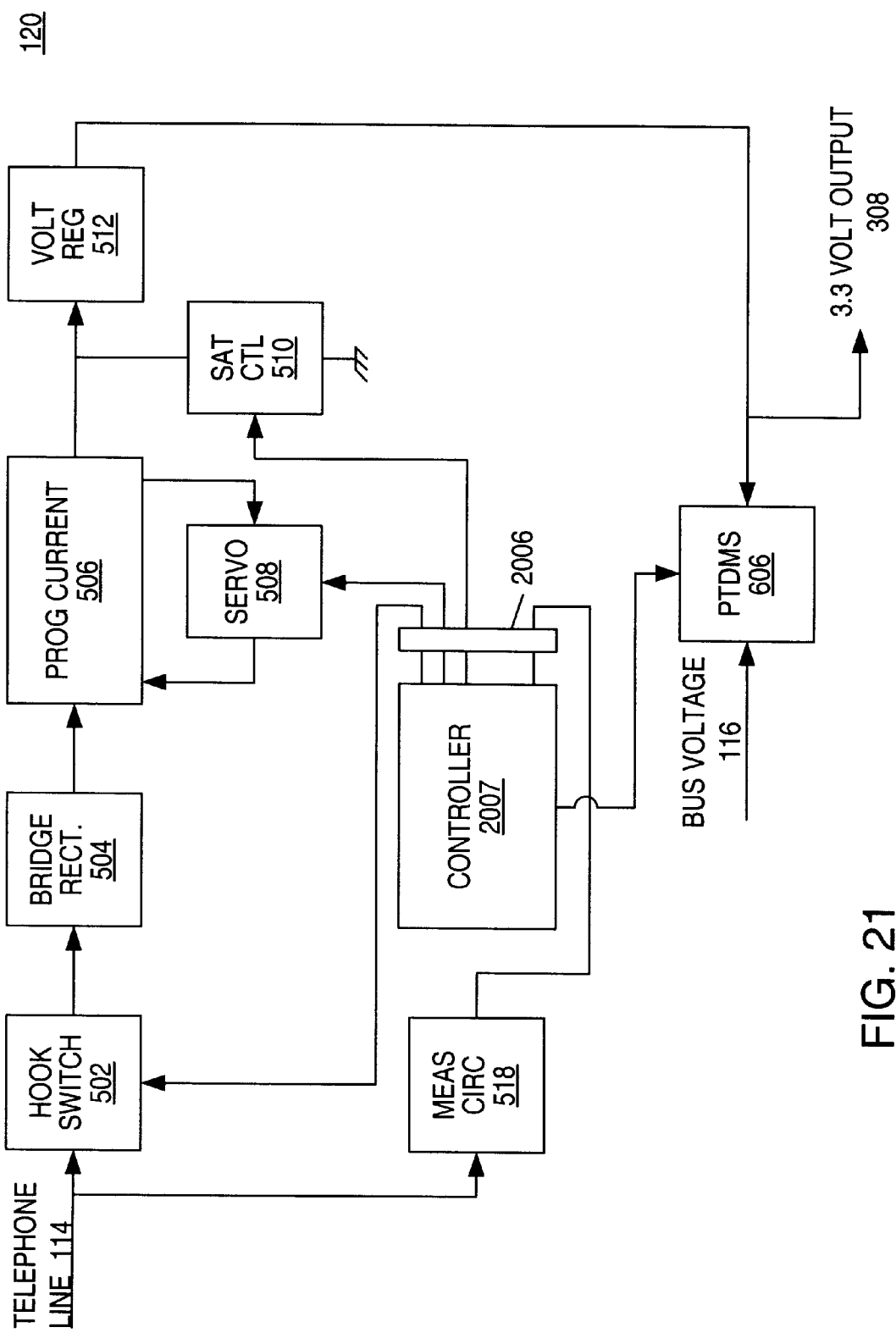
FIG. 21 is a block diagram of an adaptive power source implementing a non-isolated design according to one embodiment of the present invention.

Turning now to FIG. 21, a block diagram of an adaptive power source implementing a non-isolated design according to one embodiment of the present invention is shown. Components that are similar or identical to those discussed above are given the same reference numerals for simplicity. In the illustrated embodiment, APS 120 includes hook-switch 502, bridge rectifier 504, programmable current source 506, current servo 508, saturation control 510, voltage regulator 512, power time division multiplex switch 606, controller 2007 and measurement circuit 518.

Hook switch 502 is coupled to telephone line 114. Hook switch 502 receives a control signal from controller 2007 that indicates whether modem 109 is in an on-hook or off-hook condition. If modem 109 is on-hook, hook switch 502 is open and no current is provided to bridge rectifier 504. Alternatively, if modem 109 is off-hook, hook switch 502 is closed and the telephone signal on telephone line 114 is coupled to bridge rectifier 504 and modem 109. The audio portion of the telephone signal is provided to modem 109. The DC portion of the telephone signal is rectified by bridge rectifier 504. The output of bridge rectifier 504 is provided to programmable current source 506. Programmable current source 506 is programmed for a specific current determined by the maximum power available from the telephone line. Current servo 508 controls programmable current source 506 to insure a constant current output. Saturation control 510 clamps the voltage output of programmable current source 506 such that the transistors on the output of programmable current source 506 do not saturate. The output of programmable current source 506 is coupled to voltage regulator 512 which outputs a regulated voltage to 3.3 volt output bus 308 and 5.0 volt output bus 310. Voltage regulator 512 is enabled and disabled by a control signal from controller 2007.

PTDMS 606 supplements the power extracted from telephone line 114 with power from bus voltage 116. Controller 2007 is a conventional controller such as those described above in reference to slave adaptive controller 516 and master adaptive controller 610. Controller 2007 determines the maximum power available from telephone line 114 and sets programmable current source 506 to extract the maximum current from the telephone line. Controller 2007 additionally monitors the voltage output from hook switch 502 and sets saturation control 510 to clamp the voltage output of the current source slightly below the hook switch voltage. Controller 2007 additionally determines a power ratio of power available from the telephone system and the total power required for modem 109. Based upon the power ratio, controller 2007 controls the switching of PTDMS 606. Controller 2007 may use power time division multiplexing similar to the method described above in reference to FIG. 4. During the portion of the power cycle in which telephone line 114 is providing power, controller 2007 enables voltage regulator 512 and opens PTDMS 606. During the portion of the power cycle in which bus voltage 116 is providing power, controller 2007 disables voltage regulator 512 and closes PTDMS 606.

The non-isolated design shown in FIG. 21 advantageously provides power to modem 109 with high efficiency and low cost. However, the non-isolated design may create safety concerns by coupling the ground of the modem to the return potential of the telephone system. Safety concerns include an operator touching exposed metal surfaces of computer 102. Exposed metal surfaces of computer 102 may include a DC input, the battery compartment or a data communication bus port. Additional safety concerns may arise from a capacitive discharge from an LCD display.

The safety concern regarding exposed metal surfaces may be alleviated by including protective covers for any exposed metal surfaces. For example, a nonconductive plastic cap may be included with computer 102 to cover any exposed metal surfaces. The presence of the plastic cap may be detected by computer 102 and an off-hook condition may be inhibited if the cap is not properly in place. In the case of a DC input, APS 120 could output a power signal which is connected via cable to the DC input rather than directly wiring APS 120 to modem 109. The power cable covers the exposed metal of the DC input connector and supplies power to modem 109. APS 120 may detect the current flow to the DC input and inhibit an off-hook condition if the cable is not properly inserted. In one embodiment, the power cable may be stored in a portion of the modem PC card. A cable storage compartment may be included for the power cable and/or a telephone cable. In another embodiment, the power cable may be stored in a stylus pen used with computer 102.

Alternatively, a ground fault circuit may detect the current flowing from the tip signal to ground and from the ring signal to ground. The current levels may be continuously monitored and the phone line disconnected, i.e. enter an on-hook condition, if a ground fault is detected. In one embodiment, relay RL1 of hook switch 502 may be used to disconnect the phone line. In one embodiment, the ground fault circuit response is approximately one millisecond.

Options for handling undesirable conditions that occur during the operation of APS 120 are discussed next. If APS 120 is provided power without a phone line, master adaptive controller 610 may sense that no phone line is connected and inhibit the operation of APS 120 until a phone line is connected. Under these conditions, all power from modem 109 is delivered from battery 104. If the phone line is disconnected while APS 120 is active, APS 120 may be shut-down. In one embodiment, APS 120 may be shut-down within 200 microseconds. When the disconnection of the phone line is detected, slave adaptive controller 516 enters a low power state, DSP 108 and AT command processor 110 enter a reset state and CODEC 111 is shut down. In one embodiment, modem-side circuit 304 continues to switch and deliver power to APS 120 for about one second and then enters a low impedance mode. Power is then delivered to modem 109 from battery 104.

If the telephone line is reconnected while APS 120 is idle, APS 120 may begin a normal cold start sequence, detect the characteristics of the telephone line and begin delivering power from the telephone line when an off-hook condition is encountered.

If system power is removed from modem 109 when the modem is active, slave adaptive controller 516 may use the remaining power to reset relay RL1 which puts the telephone line on-hook. Slave adaptive controller 516 and master adaptive controller 610 then enter a low power state.

If the bus voltage fluctuates between 3.3 volts and 5 volts, APS 120 may detect the change in voltage condition and reconfigure APS 120 to the proper embodiment for the bus voltage condition. If the power available from the phone line is low, APS 120 may stop drawing power from the phone line. The amount of power delivered from the telephone line will be useful if it is above the efficiency of APS 120. If APS 120 decides not to use the power from the telephone line, power to modem 109 is supplied from battery 104.

APS 120 may tolerate a certain amount of power fluctuation during operation. If the power delivered from the phone line increases, APS 120 may adjust the power time division ratio to utilize the additional power. However, if the power from the telephone line drops, APS 120 determines whether the fluctuations occur at a rate at which APS 120 can adapt. If the fluctuations occur at a relatively slow rate, APS 120 may adjust the power time division ratio and continue to operate. If, however, the fluctuations are relatively fast, APS 120 may flag the problem and shut-down if the problem persists. In any case, if the power ratio is reduced or APS 120 is disabled, more power is delivered from battery 104 to modem 109.

Numerous variations and modifications will become apparent to those skilled in the art once the above disclosure is fully appreciated. It is intended that the following claims be interpreted to embrace all such variations and modifications.

What is claimed is:

1. A modem coupled to a telephone line and a system power supply, comprising:

a digital signal processor coupled to said telephone line and configured to send and receive data from said telephone line; and an adaptive power supply coupled to said telephone line and said system power supply, wherein said adaptive power supply is configured to use power from said telephone line and said system power supply to provide a voltage output signal that provides power to said digital signal processor;

wherein said adaptive power supply is configured to determine a maximum amount of power available from said telephone line, to convert said maximum amount of power to a voltage output signal compatible with said digital signal processor, and to provide power from said system power supply to supplement said power from said telephone line if needed.

2. The modem of claim 1 wherein said adaptive power supply is configured to measure voltage characteristics of said telephone line to determine said maximum amount of power available from said telephone line.

3. The modem of claim 1 wherein said adaptive power supply is configured to measure current characteristics of said telephone line to determine said maximum amount of power available from said telephone line.

4. A modem coupled to a telephone line and a system power supply, comprising:

a digital signal processor coupled to said telephone line and configured to send and receive data from said telephone line; and an adaptive power supply coupled to said telephone line and said system power supply, wherein said adaptive power supply is configured to use power from said telephone line and said system power supply to provide a voltage output signal that provides power to said digital signal processor;

wherein said adaptive power supply is configured to use power time division multiplexing to share said power from said telephone line and said power from said system power supply.

5. A modem coupled to a telephone line and a system power supply, comprising:

a digital signal processor coupled to said telephone line and configured to send and receive data from said telephone line; and an adaptive power supply coupled to said telephone line and said system power supply, wherein said adaptive power supply is configured to use power from said telephone line and said system power supply to provide a voltage output signal that provides power to said digital signal processor;

wherein said adaptive power supply is configured to calculate a power ratio of power available from said telephone line versus power required by said digital signal processor, wherein said adaptive power supply is configured to draw power from said telephone line for a portion of a power cycle and to draw power from said system power supply for a remaining portion of said power cycle, wherein said portion of said power cycle is determined by said power ratio.

6. A method of delivering power to a computer system coupled to a power source and a telephone line comprising:

determining an amount of power available from said telephone line;

determining an amount of power required by said computer system and a residual amount of power that exceeds said amount of power available from said telephone line;

delivering said amount of power available from said telephone line to said computer system;

delivering said residual power from said power source to said computer system.

7. The method of delivering power to a computer system of claim 6 wherein said power source is a battery of said computer system.

8. The method of delivering power to a computer system of claim 6 wherein determining said amount of power available from said telephone line comprises measuring characteristics of the telephone line.

9. The method of delivering power to a computer system of claim 8 further comprising adjusting an input impedance to match an impedance of said telephone line.

10. The method of delivering power to a computer system of claim 6 further comprising determining a power ratio of said power required by said computer system versus said power available from said telephone line.

11. The method of delivering power to a computer system of claim 10 wherein power is delivered to said computer system from said telephone line for a first portion of a power cycle and power is delivered to said computer system from said power source for a second portion of said power cycle, wherein a length of said first portion and a length of said second portion of said power cycle depend on said power ratio.

12. The method of delivering power to a computer system of claim 6 wherein said power from said telephone line provides power to a modem of said computer system.

13. A method of delivering power from two sources to a load comprising:

determining a power ratio, wherein said power ratio defines a first portion of said power to be delivered from a first power source and a second portion of said power to be delivered from a second power source;

defining a power cycle, wherein said power cycle is a time period during which said first power source and said second power source deliver a portion of said power;

dividing said power cycle into a first portion and a second portion wherein a length of said first portion and said second portion are dependent upon said power ratio;

delivering power to said load from said first source during said first portion of said power cycle; and delivering power to said load from said second source during said second portion of said power cycle.

14. The method of delivering power to claim 13 wherein said power ratio is a ratio of a maximum amount of power available from said telephone line versus an amount of power required by said load.

15. The method of delivering power of claim 13 wherein said first power source is a battery and said second power source is a telephone line.

16. A modem card, comprising:

a modem configured to couple to a computer and to a telephone line to transmit and receive data; and an adaptive power supply configured to coupled to said computer, to said modem, and to said telephone line, wherein said adaptive power supply is configured to combine power from said computer system and said telephone line on a single voltage signal to supply power to said modem;

wherein said adaptive power supply is configured to determine a ratio of maximum power available from said telephone line to power required by said modem, and draw power from said telephone line and from said computer system according to said ratio to supply power to said modem.

17. A modem card, comprising:

a modem configured to couple to a computer and to a telephone line to transmit and receive data; and an adaptive power supply configured to coupled to said computer, to said modem, and to said telephone line, wherein said adaptive power supply is configured to combine power from said computer system and said telephone line on a single voltage signal to supply power to said modem;

wherein said adaptive power supply is configured to combine power from said computer system and said telephone line by time division multiplexing.

* * * * *